(12) United States Patent
Lee et al.

(10) Patent No.: US 11,119,644 B2
(45) Date of Patent: Sep. 14, 2021

(54) ELECTRONIC DEVICE AND METHOD FOR DISPLAYING CONTENT IN RESPONSE TO SCROLLING INPUTS

(71) Applicant: SAMSUNG ELECTRONICS CO., LTD., Suwon-si (KR)

(72) Inventors: Sang-Heon Lee, Seoul (KR); Seo-Young Kim, Seoul (KR); Jin-Sung Kim, Seoul (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 111 days.

(21) Appl. No.: 15/875,486

(22) Filed: Jan. 19, 2018

(65) Prior Publication Data
US 2018/0210621 A1 Jul. 26, 2018

(30) Foreign Application Priority Data
Jan. 20, 2017 (KR) .................. 10-2017-0010038

(51) Int. Cl.
*G06F 3/0485* (2013.01)
*G06F 3/01* (2006.01)
*G06F 3/0488* (2013.01)

(52) U.S. Cl.
CPC ............ *G06F 3/0485* (2013.01); *G06F 3/017* (2013.01); *G06F 3/0488* (2013.01); *G06F 3/04883* (2013.01); *G06F 2203/04803* (2013.01)

(58) Field of Classification Search
CPC ........ G06F 3/0485; G06F 3/017; G06F 3/046; G06F 2203/04803
See application file for complete search history.

(56) References Cited

U.S. PATENT DOCUMENTS

| 9,030,419 B1* | 5/2015 | Freed .................... G06F 3/0416 345/173 |
| 2002/0109728 A1* | 8/2002 | Tiongson ............ G06F 3/04855 715/786 |
| 2008/0222558 A1 | 9/2008 | Cho et al. |

(Continued)

FOREIGN PATENT DOCUMENTS

| JP | 2013-084282 | 5/2013 |
| JP | 2016-149005 | 8/2016 |

(Continued)

OTHER PUBLICATIONS

International Search Report and Written Opinion dated Apr. 26, 2018 in counterpart International patent application PCT/KR2018/000904.

(Continued)

*Primary Examiner* — Roland J Casillas
(74) *Attorney, Agent, or Firm* — Nixon & Vanderhye P.C.

(57) ABSTRACT

An electronic device may include a display, a memory storing a plurality of objects, and a processor configured to display at least a portion of a scroll page including the plurality of objects on a screen of the display and to, when a speed of a scroll input is a preset value or more while the scroll input is entered to the screen (quick scroll input), display at least one second object corresponding to at least one first object selected from among the plurality of objects. Other various embodiments are possible as well.

18 Claims, 14 Drawing Sheets

(56) References Cited

U.S. PATENT DOCUMENTS

| | | | |
|---|---|---|---|
| 2009/0070710 A1* | 3/2009 | Kagaya | G06F 16/44 715/810 |
| 2010/0287154 A1* | 11/2010 | Tee | G06F 3/04855 707/708 |
| 2011/0122159 A1* | 5/2011 | Bergsten | G06F 3/04886 345/684 |
| 2011/0154196 A1 | 6/2011 | Icho et al. | |
| 2014/0250408 A1* | 9/2014 | Shin | G06F 3/0485 715/784 |
| 2014/0258922 A1 | 9/2014 | Lee et al. | |
| 2014/0292760 A1* | 10/2014 | Shikolay | G06F 3/0488 345/428 |
| 2015/0007016 A1* | 1/2015 | Lee | G06F 3/0485 715/234 |
| 2015/0116371 A1 | 4/2015 | Jun et al. | |

FOREIGN PATENT DOCUMENTS

| | | |
|---|---|---|
| KR | 10-2014-0111171 | 9/2014 |
| KR | 10-2014-0122292 | 10/2014 |
| KR | 10-2016-0049455 | 5/2016 |
| KR | 10-2016-0135586 | 11/2016 |

OTHER PUBLICATIONS

Extended European Search Report dated Jan. 2, 2020 for EP Application No. 18742256.3.

\* cited by examiner

ELECTRONIC DEVICE AND METHOD FOR DISPLAYING CONTENT IN RESPONSE TO SCROLLING INPUTS

CROSS-REFERENCE TO RELATED APPLICATION

This application is based on and claims priority under 35 U.S.C. § 119 to a Korean patent application filed in the Korean Intellectual Property Office on Jan. 20, 2017 and assigned Serial No. 10-2017-0010038, the entire disclosure of which is incorporated by reference herein in its entirety.

FIELD

The present disclosure relates to electronic devices and/or to methods for displaying screen by electronic devices upon quick scrolling.

DISCUSSION OF RELATED ART

An electronic device may run various applications to provide the user with diversified services. As an application runs, a page including various types of objects (e.g., images, multimedia data, voice data, text, or list items) may be displayed on the screen of the electronic device.

If not all of the objects are displayed on the screen, the page needs to be scrolled down. There have been proposed techniques for such purposes.

The user may have difficulty in catching up with objects when the page is swiftly scrolled, as well as the current position.

Thus, a need exists for techniques for figuring out the objects and/or current position on a quickly-scrolled page.

The above information is presented as background information only to assist with an understanding of the present disclosure. No determination has been made, and no assertion is made, as to whether any of the above might be applicable as prior art with regard to the present disclosure.

SUMMARY

There may be provided techniques for displaying a portion of a page with multiple objects which does not show up on the screen as the page is scrolled. An example way to do so is loading, in advance, the objects of the page to be displayed on the screen while the scroll input is entered, thereby displaying some of the objects of the page corresponding to the screen size.

However, such pre-loading of the objects may result in speed loss. Moreover, the conventional scrolling scheme may only perform scrolling without uploading all the objects, or even if it may, display only a few small-sized preset objects if the scrolling speed exceeds a preset value, rendering it difficult to grasp the objects and/or current position corresponding to the scrolling operation.

According to example embodiments of the present disclosure, there may be provided an electronic device and/or a method for displaying screen by the electronic device, which may display some objects selected from among a plurality of objects included in a scroll page (and/or objects generated based on the selected objects), rather than all of the plurality of objects while a scroll input is entered to the display screen of the electronic device displaying at least a portion of the scroll page, enhancing the scroll speed while allowing the user to grasp the current position of the scroll and/or objects corresponding to the scroll.

According to an example embodiment of the present disclosure, an electronic device may include a display, a memory storing a plurality of objects, and a processor configured to display at least a portion of a scroll page including the plurality of objects on a screen of the display and to, when a speed of a scroll input is a preset value or more while the scroll input is entered to the screen, display, on the display, at least one second object corresponding to at least one first object selected from among the plurality of objects.

According to an example embodiment of the present disclosure, a method for displaying a screen by an electronic device may comprise displaying at least a portion of a scroll page including a plurality of objects on a screen of a display of the electronic device, and when a speed of a scroll input is a preset value or more while the scroll input is entered to the screen, displaying, on the display, at least one second object corresponding to at least one first object selected from among the plurality of objects.

According to an example embodiment of the present disclosure, there may be provided a computer readable recording medium recording a program running on a computer, the program including executable commands executed by a processor to enable the processor to display at least a portion of a scroll page including a plurality of objects on a screen of a display of the electronic device and when a speed of a scroll input is a preset value or more while the scroll input is entered to the screen, display, on the display, at least one second object corresponding to at least one first object selected from among the plurality of objects.

Other aspects, advantages, and/or salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
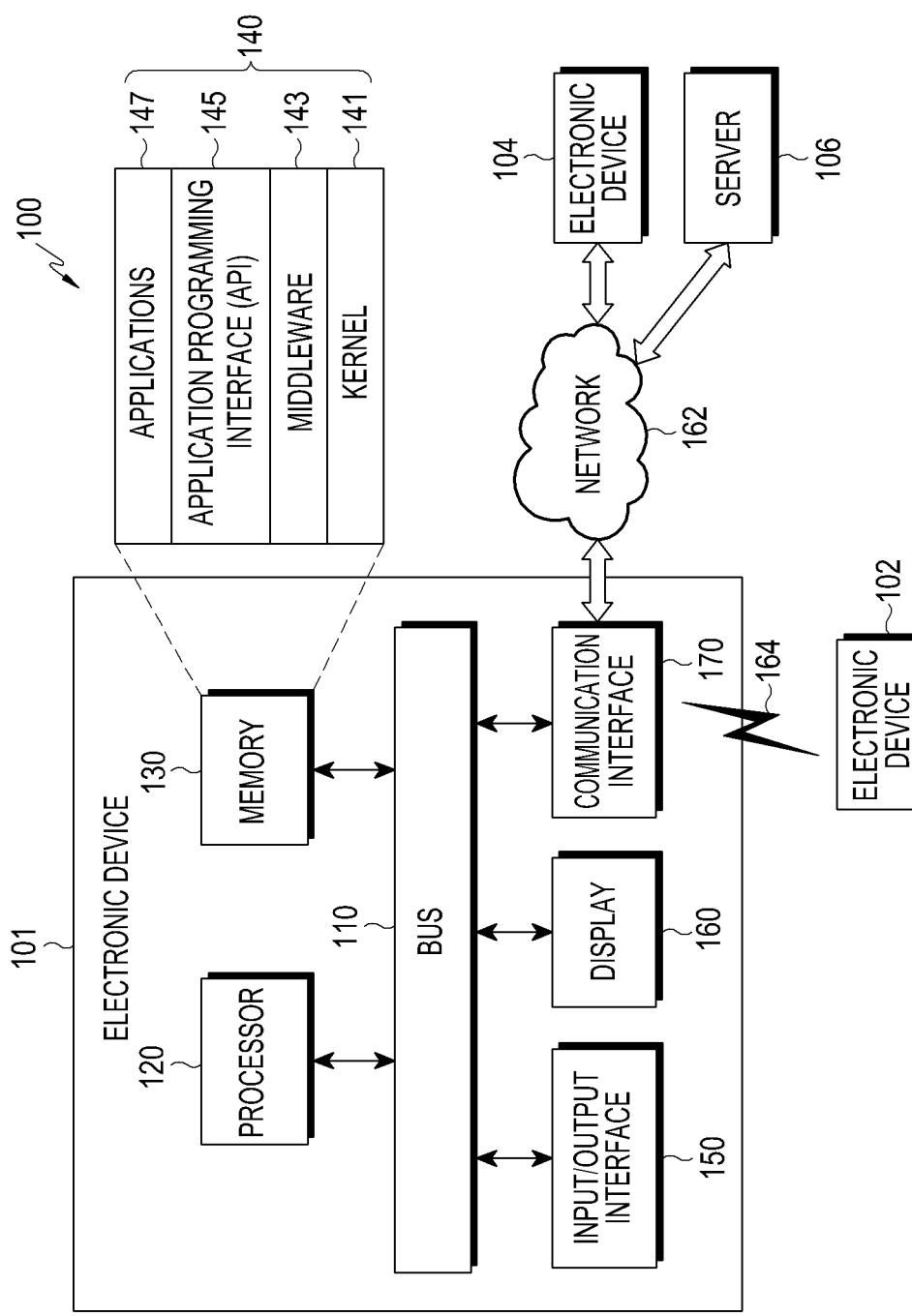
FIG. 1 is a view illustrating an electronic device in a network environment according to an embodiment of the present disclosure.

Hereinafter, example embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations are used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via at least a third element(s).

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an example embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various example embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to example embodiments of the present disclosure, the electronic device may be flexible or may be a combination of the above-enumerated electronic devices. According to an example embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an example embodiment of the present disclosure, an electronic device 101 is included in a network environment 100. The electronic device 101 may include a bus 110, a processor (including processing circuitry) 120, a memory 130, an input/output interface (including interface circuitry) 150, a display 160, and a communication interface (including communication interface circuitry) 170. In example embodiments, the electronic device 101 may exclude at least one of the above components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an example embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, an IPS display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106), and may communication with electronic device 102 wirelessly 164.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). According to an embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an example embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an example embodiment of the present disclosure, all or some of operations executed on the electronic device 101 may be executed on another or multiple other electronic devices (e.g., the electronic device(s) 102 and/or 104 or server 106). According to an example embodiment of the present disclosure, when the electronic device 101 should perform some function or service automatically or at a request, the electronic device 101, instead of executing the function or service on its own or additionally, may request another device (e.g., electronic devices 102 and/or 104, and/or server 106) to perform at least some functions associated therewith. The other electronic device (e.g., electronic devices 102 and 104 or server 106) may execute the requested functions and/or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
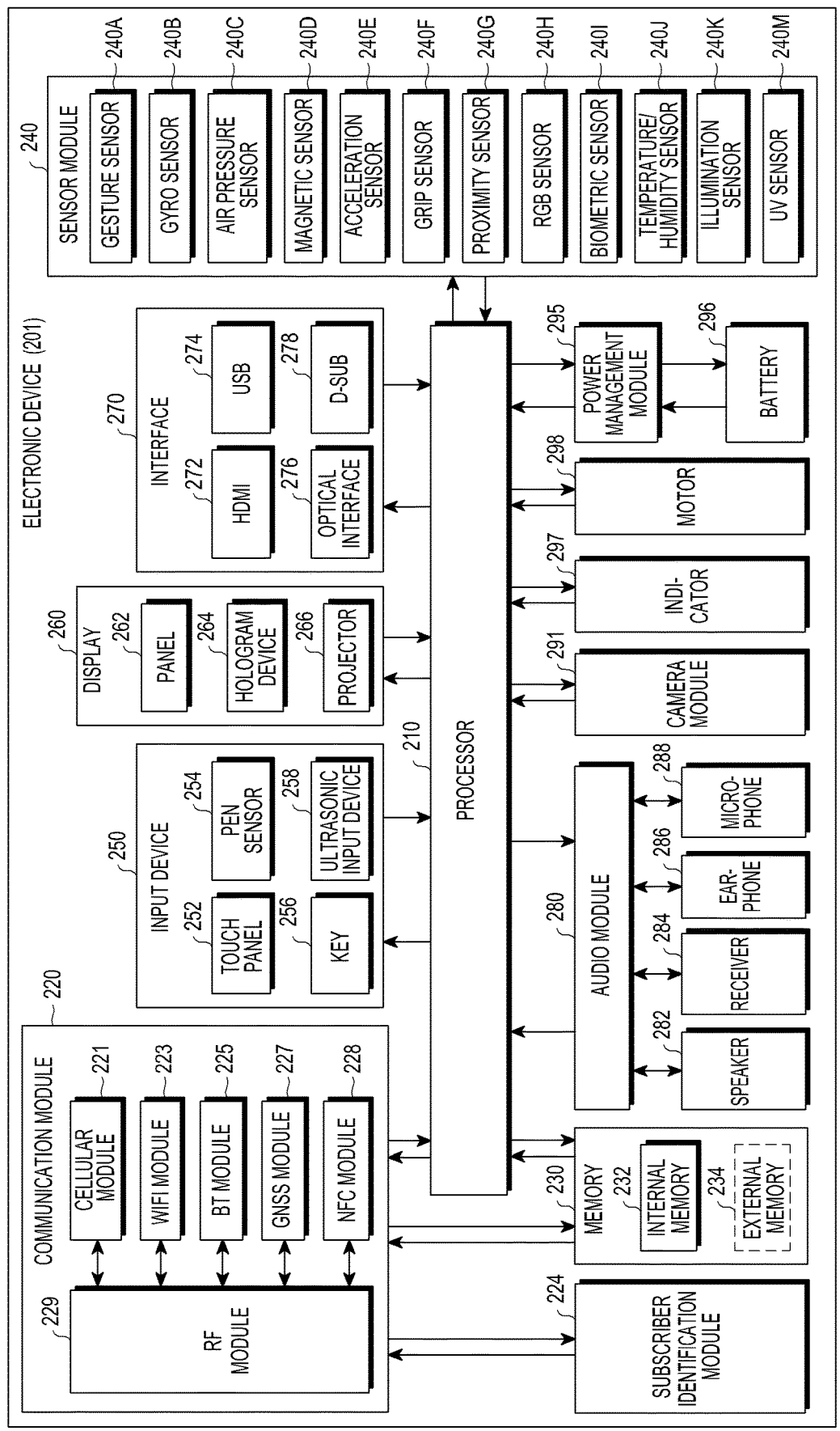
FIG. 2 is a block diagram illustrating an electronic device according to an embodiment of the present disclosure.

FIG. 2 is a block diagram illustrating an electronic device 201 (or 101) according to an example embodiment of the present disclosure. The electronic device 201 may include the whole or part of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298, each of which includes circuitry for performing the respective functions. The processor 210, which may include processing circuitry, may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components of other elements shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170 of FIG. 1. The communication module 220 may include, e.g., a cellular module 221, a wireless fidelity (Wi-Fi) module 223, a bluetooth (BT) module 225, a GNSS module 227, a NFC module 228, and a RF module 229, each of which may include circuitry for performing the respective functions. The cellular module 221 may provide voice call, video call, text, or Internet services through, e.g., a communication network. According to an example embodiment of the present disclosure, the cellular module 221 may perform identification and/or authentication on the electronic device 201 in the communication network using a subscriber identification module 224 (e.g., the SIM card). According to an example embodiment of the present disclosure, the cellular module 221 may perform at least some of the functions providable by the processor 210. According to an example embodiment of the present disclosure, the cellular module 221 may include a communication processor (CP), including processing circuitry. According to an example embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), and/or an antenna. According to an example embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (IC-CID) or subscriber information (e.g., an international mobile subscriber identity (IMSI)).

The memory 230 (e.g., the memory 130) may include, e.g., an internal memory 232 and/or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick®. The external memory 234 may be functionally or physically connected with the electronic device 201 via various interfaces.

For example, the sensor module 240 may measure a physical quantity or detect an motion state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M, each of which includes circuitry for performing the respective functions. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an example embodiment of the present disclosure, the electronic device 201 may further include a processor configured to control the sensor module 240 as part of the processor 210 or separately from the processor 210, and the electronic device may control the sensor module 240 while the processor 210 is in a sleep mode.

The input unit 250, including input circuitry, may include, e.g., a touch panel 252, a (digital) pen sensor 254, a key(s) 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, keyboard, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a display panel 262, a hologram device 264, a projector 266, and/or a control circuit for controlling the same. The panel 262 may be implemented to be flexible, transparent, and/or wearable. The panel 262, together with the touch panel 252, may be configured in one or more modules. According to an example embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The optional hologram device 264 may make three dimensional (3D) images (holograms) in the air by using light interference. The optional projector 266 may display an image by projecting light onto a screen. The screen may be, for example, located inside or outside of the electronic device 201. The interface 270, including interface circuitry, may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may be for converting, e.g., a sound signal into an electrical signal and/or vice versa. At least a part of the audio module 280 may be included in e.g., the input/output interface 150 as shown in FIG. 1. The audio module 280 may process sound information input and/or output through e.g., a speaker 282, a receiver 284, an earphone 286, or a microphone 288. For example, the camera module 291 may be a device for capturing still images and videos, and may include, according to an example embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an example embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device 201, including e.g., a booting state, a message state, and/or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
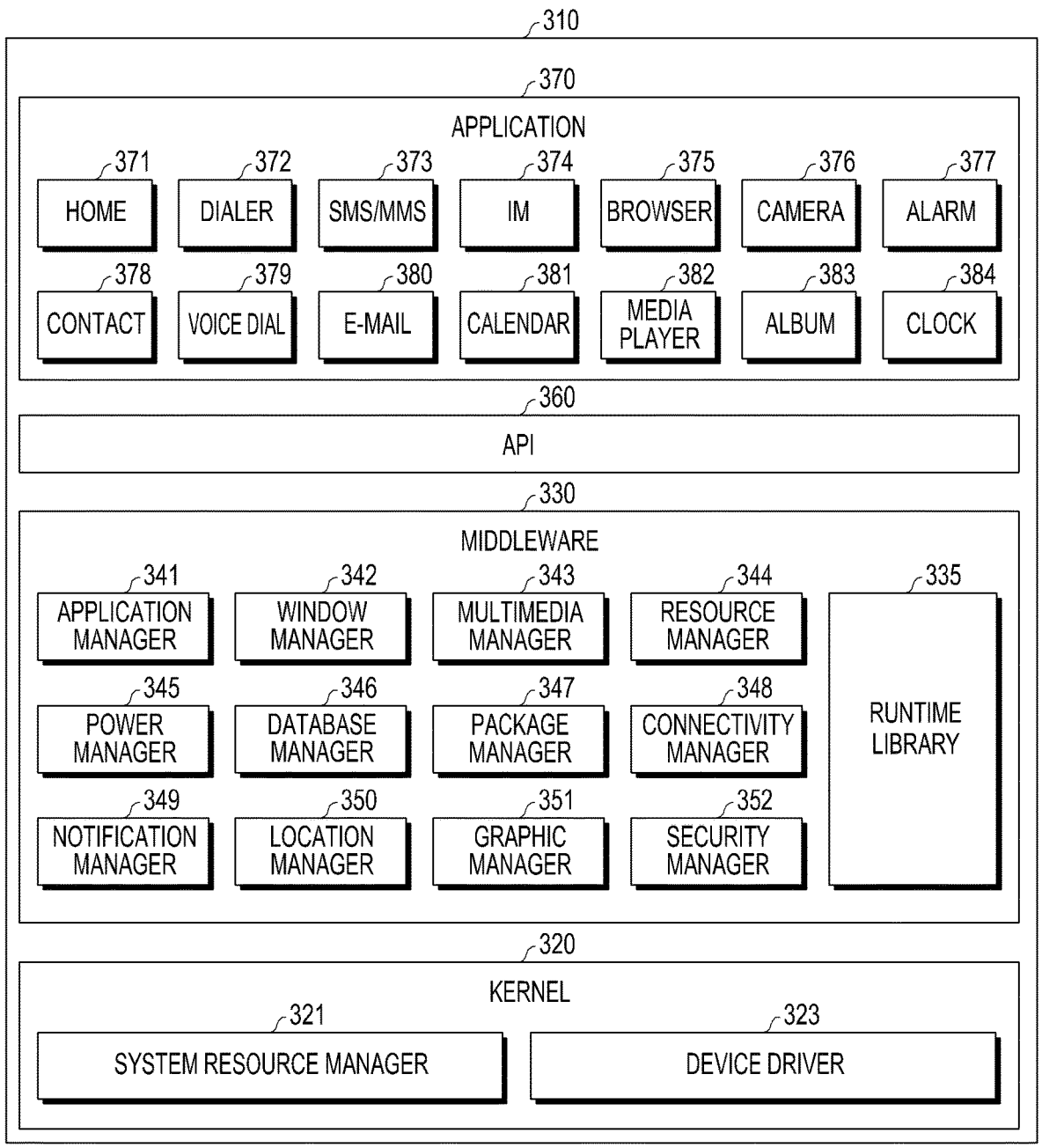
FIG. 3 is a block diagram illustrating a program module according to an embodiment of the present disclosure.

FIG. 3 is a block diagram illustrating a program module according to an example embodiment of the present disclosure. According to an example embodiment of the present disclosure, the program module 310 (e.g., including the program 140 shown in FIG. 1) may include an operating system (OS) controlling resources related to the electronic device (e.g., the electronic device 101) and/or various applications (e.g., the application processor 147) driven on the operating system. The OS may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143 shown in FIG. 1), an API 360 (e.g., the API 145 shown in FIG. 1), and/or an application 370 (e.g., the application program 147 shown in FIG. 1). At least a part of the program module 310 may be preloaded on the electronic device and/or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an example embodiment of the present disclosure, the system resource manager 321 may include a process managing unit, a memory managing unit, or a file system managing unit. The device driver 323 may include, e.g., a display driver, a camera driver, a bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an example embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an example embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an example embodiment of the present disclosure, the middleware 330 may include a telephony manager for managing the voice or video call function of the electronic device or a middleware module able to form a combination of the functions of the above-described elements. According to an example embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application(s) that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an example embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an example embodiment of the present disclosure, the application 370 may include an application (e.g., a health-care application of a mobile medical device) designated according to an attribute of the external electronic device. According to an example embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an example embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various example embodiments of the present disclosure may be carried out sequentially, in parallel, repeatedly or heuristically, or at least some operations may be executed in a different order or omitted or other operations may be added.

Figure 4:
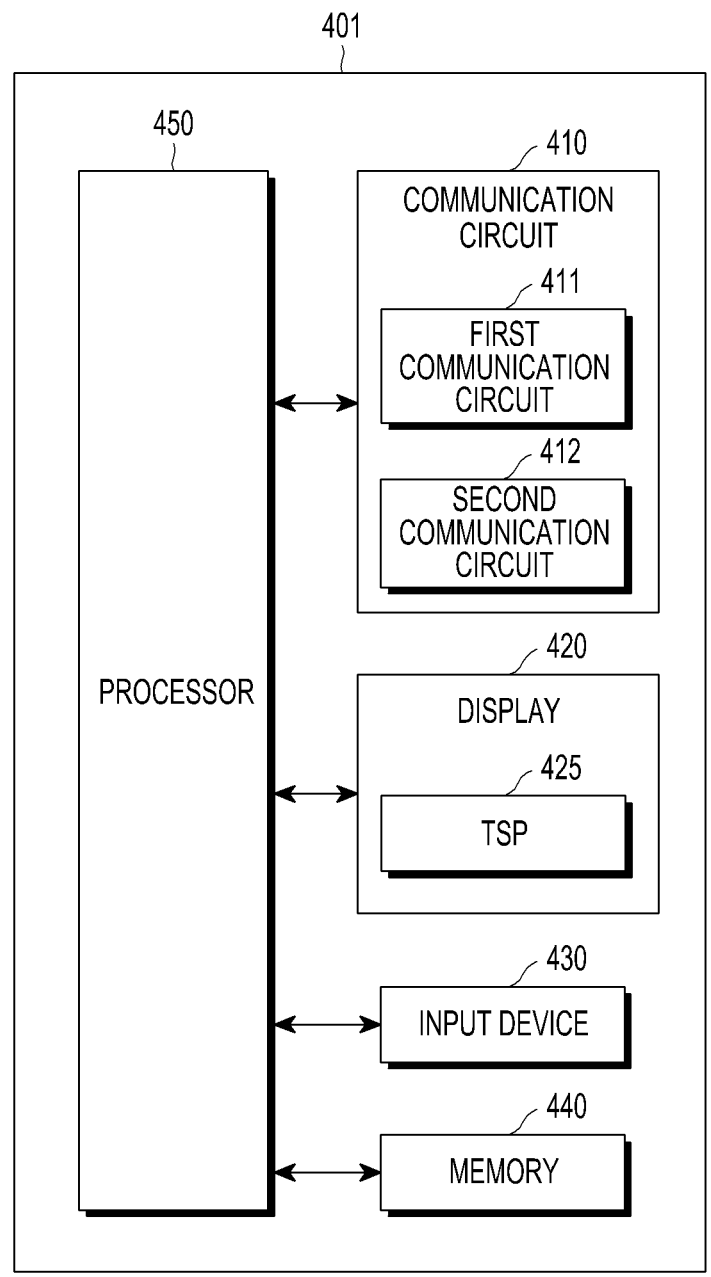
FIG. 4 is a block diagram illustrating an electronic device according to an embodiment of the present disclosure.

FIG. 4 is a block diagram illustrating an electronic device (401, 201, 101) according to an example embodiment of the present disclosure.

Referring to FIG. 4, according to an embodiment of the present disclosure, an electronic device 401 may include at least one of a communication circuit 410, a display 420, an input device 430, a memory 440, and/or a processor 450. FIG. 4 illustrates y components related to example embodiments of the present disclosure, and other components than the above-listed components may also be included. For example, the electronic device 401 of FIG. 4 may include the whole or part of the electronic device 101 of FIG. 1 or the whole or part of the electronic device 201 of FIG. 2.

The communication circuit 410 may establish a communication link with at least one external electronic device (e.g., the electronic devices 102 and/or 104, and/or server 106 of FIG. 1) and receive predetermined information from the external electronic device.

The communication circuit 410 may include at least one of, e.g., a first communication circuit 411 and/or a second communication circuit 412. The communication circuit 410 may include the whole or part of, e.g., the communication interface 170 of FIG. 1 and/or the communication module 220 of FIG. 2. The communication circuit 410 may also be termed a communication unit or communication module, include a communication unit or communication module as part thereof, or may configure a communication unit or communication module.

According to an example embodiment of the present disclosure, the first communication circuit 411 may provide data based on short-range communication. For example, the communication circuit 410 may establish a communication link (e.g., via 162 and/or 164) with at least one external electronic device (e.g., the electronic devices 102 and 104 or server 106 of FIG. 1) connected with a first network through the first communication circuit 411. For example, the first communication circuit 411 may include at least one of, e.g., a wireless fidelity (Wi-Fi), bluetooth, near-field communication (NFC), zigbee, z-wave, or global navigation satellite system (GNSS) module or unit.

According to an example embodiment of the present disclosure, the second communication circuit 412 may provide packet data (e.g., internet protocol)-based services. For example, the communication circuit 410 may communicate with at least one external electronic device (e.g., the electronic devices 102 and 104 or server 106 of FIG. 1) through the second communication circuit 412. For example, the second communication circuit 412 may include at least one of, e.g., a computer network (e.g., local area network (LAN) or wide area network (WAN)), internet, or a telephony network.

The communication circuit 410 may receive information from at least one external electronic device (e.g., the electronic device 104 or server 106) through at least one of, e.g., the first communication circuit 411 or the second communication circuit 412. For example, the information may include at least one object that may be displayed on the display 420 of the electronic device 401. The object may be at least one of, e.g., an image (e.g., a picture, still image, or video), multimedia data, voice data, text, list item, or a combination thereof.

The display 420 may include, e.g., a touchscreen panel (TSP) 425. The electronic device 401 (e.g., via the processor 450) may provide a user interface corresponding to, e.g., various services (e.g., calling, data communication, broadcast, photographing, or running an application) to the user through the display 420. The electronic device 401 may transmit an (e.g., analog) signal corresponding to at least one touch on the user interface, which is obtained through, e.g., the TSP 425, to at least one of the processor 450 and/or a touch driver. The TSP 425 may receive at least one touch through, e.g., the user's body part (e.g., finger) or an input means (e.g., a touch pen) that may make a touch. The TSP 425 may receive a continuous movement of a touch (e.g., a drag, swipe, continuous touch, flick, or scroll) among the at least one touch. The electronic device 401 may transmit an (e.g., analog) signal corresponding to a continuous movement entered through, e.g., the TSP 425 to at least one of the processor 450 and/or a touch driver.

The TSP 425 may be implemented in, e.g., a resistive scheme, capacitive scheme, electronic magnetic resonance (EMR) scheme, infrared (IR) scheme, acoustic wave scheme, or a combination of at least one or more thereof.

The TSP 425 may be disposed on, e.g., the front surface of the electronic device 401 or may be formed on at least a portion of the front surface of the electronic device 401. The TSP 425 and/or display 420 may be formed to take up a majority (e.g., 90% or more) of the front surface of the electronic device 410. The TSP 425 may include, e.g., a liquid crystal display (LCD) or active matrix organic light emitting diode (AMOLED) panel, an OLED or LED panel, an IPS panel, or the like. The TSP 425 may display various data or content on the display screen 420 according to various operation states of the electronic device 401, services and/or execution of an application.

The display 420 may include a touch driver (not shown). The touch driver (not shown) may convert, e.g., an analog signal received from the TSP 425 into a digital signal (e.g., X and/or Y coordinate) and transmit the digital signal to the processor 450.

The input device 430 may include the whole or part of the input/output interface 150 of FIG. 1 and/or the input device 250 of FIG. 2. The input device 430 may receive a command or data entered from the user or another external device. For example, the input device 430 may receive a scroll input from the user, and the scroll input entered through the input device 430 may be delivered and processed by the processor 450. The input device 430 may include at least one of, e.g., a keyboard, mouse, touchpad, and/or a combination thereof.

For example, the memory 440 may store commands or data related to at least one other component of the electronic device 401. The memory 440 may include the whole or part of the memory 130 of FIG. 1 and/or the memory 230 of FIG. 2. The memory 440 may store at least one object that may be displayed on the display 420. For example, when a predetermined application runs, the display 420 may display at least a portion of a scroll page (e.g., a list view, an application page, or a webpage) including a plurality of objects, and the memory 440 may store the plurality of objects. The object may be at least one of, e.g., an image (e.g., a picture, still image, or video), multimedia data, voice data, text, list item, or a combination thereof. The memory 440 may store information (e.g., meta information) related to each object. The meta information may include all the information related to the object, e.g., at least some of property information, tag information, or analysis information about the object.

According to an example embodiment of the present disclosure, the property information may include at least some of, e.g., the name (e.g., a file name) of the object, format (e.g., image (e.g., JPG, GIF, TIF, or BMP), video (e.g., AVI, WMW, MPEG, MPG, or MKV), document (e.g., DOC, PPT, or PDF), size, volume, time created, time changed, time accessed, access count (e.g., view count or touch event count), access authority, owner information (e.g., owner, owner group, or other users), information about capture place (e.g., geographical location information or GPS positioning information), information about capturing device (e.g., camera information), information about sharing (e.g., whether it is shared with other application), or a combination thereof.

According to an example embodiment of the present disclosure, the tag information may be information tagged in relation to the object, and the tag information may include at least one of, e.g., a keyword automatically extracted from the property information about the object by the electronic device, a keyword entered by the user, or a combination thereof. The tag information may be included in the property information.

According to an example embodiment of the present disclosure, the analysis information may include at least one of, e.g., information analyzed from the object, information extracted from the property information about the object, or information reconfigured based on the analyzed information and the extracted information. When the object is an image, the information analyzed from the object may include at least one of, e.g., figure information analyzed by a scheme for recognizing a face or object in the image, object information, or place information analyzed based on the object information. When the object is a picture, image, or video, the processor 450 may analyze a figure, building, or place included in the object using the face or object recognition scheme.

The processor 450 (or 210, 120) may overall control the electronic device 401. The processor 450, including processing circuitry, may control multiple hardware and software components connected to the processor 450 by running, e.g., an operating system or application programs, and the processor 450 may process and compute various data.

The processor 450 may display at least a portion of a scroll page (e.g., a list view, application page, or webpage) including the plurality of objects (e.g., images (e.g., pictures, still images, or videos), multimedia data, voice data, text, or list items) on the display 420. For example, upon running an image-related application (e.g., a gallery or album application), the processor 450 may display at least a portion of a scroll page (e.g., a list view) including a plurality of objects, e.g., images or list items, stored in the memory 440, on the screen of the display 420. The processor 450 may display, on the screen of the display 420, at least a portion of a scroll page (e.g., a webpage) including a plurality of objects, e.g., images, multimedia data, voice data, text, or list items (e.g., an internet forum list or news article list), stored in the memory 440 upon running a news or information search-related application (e.g., a web browser or search engine).

The processor 450 may sort the plurality of objects in the scroll page in a preset order. For example, the preset order may be set based on at least one of, e.g., the property information, tag information, analysis information about each object, or a combination thereof.

According to an example embodiment of the present disclosure, the processor 450 may sort the plurality of objects in the scroll page in order of time, e.g., year/month/day/hour, based on the time created or time changed included in the property information.

According to an example embodiment of the present disclosure, the processor 450 may sort the plurality of objects in the scroll page according to the keyword of the tag information.

According to an example embodiment of the present disclosure, the information analyzed from a corresponding object included in the analysis information may include object-related information about the object recognized using an object recognition technique. For example, when the object is an image (e.g., a picture, still image, or video), the processor 450 may analyze a figure, building, or place included in the object using an object recognition scheme. The processor 450 may sort the plurality of objects in the scroll page according to the figure, building, or place recognized.

The scroll page may be larger in size than the screen of the display 420 in which case the processor 450 may receive, through the display screen, a scroll input towards a portion of the scroll page that does not show up on the display screen to display the hidden portion.

While receiving the scroll input through the screen of the display 420 with at least part of the scroll page displayed, the processor 450 may select at least one of multiple first objects corresponding to the screen size of the display 420 among the plurality of objects and display at least one second object corresponding to the selected, at least one, first object on the display 420.

For example, the processor 450 may detect a scroll input on the screen of the display 420 displaying at least part of the scroll page. The processor 450 may detect the direction of the scroll input based on, e.g., the speed of the scroll input and the size of the scroll page. The processor 450 may detect the scroll input through the TSP 425 of the display 420. The processor 450 may also or instead detect the scroll input through the input device 430 (e.g., a mouse wheel or keypad).

When the speed of the scroll input is a preset value or more (when the scroll input is fast, for quick scrolling), the processor 450 may split the scroll page into a plurality of blocks based on at least one or more of the screen size of the display 420 corresponding to the direction of the scroll input, the size of the scroll page, and/or a block split reference. For example, the processor 450 may determine the size of the blocks considering the size of the scroll page and the screen size of the display 420 corresponding to the direction of the scroll input. For example, the size of the blocks may be set to be larger than the screen of the display 420 corresponding to the direction of the scroll input. The processor 450 may split the scroll page into a plurality of blocks based on the block split reference.

According to an example embodiment of the present disclosure, the block split reference may include at least one of, e.g., time information, place information, figure information, capturing device information, tag information, or a combination thereof based on the number of designated objects for each block, the number of designated blocks, the size of designated block, the time when the object was created, and/or the time when the object was changed.

For example, the processor 450 may split the scroll page into a plurality of blocks based on the number of designated objects for each of the plurality of objects included in the scroll page or the number of designated blocks for the plurality of blocks among the block split references. The processor 450 may split the scroll page into a plurality of blocks based on the size of designated blocks. The number of designated objects or the number or size of blocks may be set to differ depending on, e.g., the speed of the detected scroll input. For example, as the speed of the detected scroll input increases, the processor 450 may set the number of designated objects to increase. As the number of designated objects increases, the number of blocks of the scroll page may be decreased when the number of the plurality of objects is divided by the number of the designated objects, so that that the size of each block may increase. As the speed of the scroll input increases, the processor 450 may set the number of designated blocks to decrease/reduce. As the number of designated blocks decreases, the size of each block split from the scroll page may increase. As the speed of the scroll input increases (indicating a quicker scroll), the processor 450 may set the size of the designated blocks to increase. In other words, the size of each block may be set to increase as the scrolling speed increases, which means that as scrolling speeds up, less second objects may be displayed on the display 420. That is, as the scrolling speed goes up, the interval between the second objects displayed on the display 420 may increase.

The processor 450 may split the scroll page into a plurality of blocks based at least on the time when the object was created and/or the time when the object was changed among the block split references. For example, the processor 450 may divide the plurality of objects in the scroll page per year/month/day/hour based on the time created or time changed included in the property information of the meta information of the object, thereby splitting the scroll page into a plurality of blocks.

The processor 450 may split the scroll page into a plurality of blocks based on one or more of the place information, figure information, and capturing device information among the block split references. For example, the processor 450 may divide the plurality of objects in the scroll page per figure, place, or capturing device based on the place information or capturing device information included in the property information of the meta information of the object, thereby splitting the scroll page into a plurality of blocks. Among the block split references, the figure information or place information may include figure information or place information included in the analysis information, obtained using a face or object recognition scheme, of the meta information on the object.

The processor 450 may split the scroll page into a plurality of blocks based at least on the tag information among the block split references. For example, the processor 450 may divide the plurality of objects in the scroll page per tagging information based on the information tagged in relation with the object included in the tag information of the meta information about the object, splitting the scroll page into a plurality of blocks.

For example, the plurality of blocks split based on the number of designated objects, the number of designated blocks, and the size of designated blocks among the block split references may have the same size. The plurality of blocks split based on the tag information, capturing device information, figure information, place information, and time information based on the time when the object was created or changed among the block split references may have different sizes.

The processor 450 may select at least one first object among at least one object included in each block as a representative object. For example, the processor 450 may select the at least one first object among the at least one object included in each block based on a representative object selection reference.

According to an example embodiment of the present disclosure, the representative object selection reference may include at least one of, e.g., the sorting turn of the object in each block, access count (e.g., view count or touch event count), whether corrected or not, whether shared with other application, whether user-designated or not, and/or any combination thereof.

According to an example embodiment of the present disclosure, the processor 450 may select, as a representative object, the first object corresponding to a designated sorting turn among the at least one object in each block.

According to an example embodiment of the present disclosure, the processor 450 may select, as a representative object, the first object most accessed (e.g., viewed most or having triggered most touch events) among the at least one object in each block based on, e.g., the property information (e.g., time accessed or access count) about the object.

According to an example embodiment of the present disclosure, the processor 450 may select, as the representative object, a corrected first object or a first object corrected latest among the at least one object in each block based on the property information (e.g., time changed) about the object.

According to an example embodiment of the present disclosure, the processor 450 may select, as the representative object, a first object used by another application (e.g., shared with the other application), such as a background or social media application, among the at least one object in each block based on the property information (e.g., share information) about the object.

According to an example embodiment of the present disclosure, the processor 450 may select, as the representative object, a first object designated by the user among the at least one object in each block based on the property information (e.g., tag information) about the object. The first object designated by the user may previously be set and included in the tag information.

According to an embodiment of the present disclosure, the processor 450 may generate at least one second object corresponding to the at least one representative object based on the at least one representative object. For example, the processor 450 may adjust at least one of, e.g., the size or transparency of the at least one first object selected, or any combination thereof, generating the at least one second object. The processor 450 may generate the at least one second object based on the meta information about the at least one first object selected. For example, the processor 450 may perform reconfiguration based on information extracted from at least part of the property information, tag information, analysis information, or any combination thereof included in the meta information about the at least one first object selected, thereby generating the at least one second object. The at least one second object may include at least one of, e.g., an image, text, voice data, or a combination thereof. The voice data may be voice data included in at least one of, e.g., the property information, tag information, or analysis information about the at least one first object. The voice data may include voice data (e.g., text-to-speech (TTS) data) corresponding to text reconfigured based on information extracted from at least part of the property information, tag information, analysis information, or a combination thereof of the at least one first object.

The processor 450 may display the at least one generated second object on the display 420. For example, the processor 450 may display the at least one second object in the position of the selected first object (i.e., the representative object), a central position of the screen, a position corresponding to the scroll bar as per the scroll input, or any combination thereof. For example, the processor 450 may generate the at least one second object adjusted according to at least one of the size, transparency, or any combination thereof, of the at least one selected first object (i.e., at least one representative object) in the at least one position and display the at least one generated second object on the display 420. Or, the processor 450 may generate the at least one second object reconfigured based on the information extracted from at least part of the property information, tag information, analysis information, or any combination thereof, of the at least one selected first object (i.e., the at least one representative object) in the at least one position and display the at least one generated second object on the display 420.

When the speed of the scroll input is the preset value or more while the scroll input is entered to the screen of the display 420 (e.g., a quick scrolling input), the processor 450 may abstain from displaying the plurality of objects on the other area of the scroll page than the at least one second object. In other words, the processor 450 may not load the plurality of objects and may leave the area of the scroll page other than the at least one second object as an empty space.

When the speed of the scroll input is the preset value or more while the scroll input is entered to the screen of the display 420, the processor 450 may display at least one preset replacement image for the area of the scroll page other than the at least one second object on the display screen. The at least one preset replacement image may have a relatively tiny volume as compared with the plurality of objects.

Meanwhile, when the at least one second object includes the voice data, the processor 450 may output the voice data through a predetermined sound output device (e.g., the speaker 282) while the at least one second object is displayed on the display screen 420.

According to an example embodiment of the present disclosure, the electronic device 401 may include the display 420, the memory 440 for storing a plurality of objects, and the processor 450. The processor 450 may be set to display at least part of the scroll page including the plurality of objects on the display screen 420. When the speed of the scroll input is a preset value or more while the scroll input is entered to the screen of the display 420, the processor 450 may be set to display, on the display 420, at least one second object corresponding to at least one first object selected from among the plurality of objects, for example.

According to an embodiment of the present disclosure, the number of the at least one selected first object may be smaller than the number of the plurality of objects.

According to an example embodiment of the present disclosure, when the speed of the scroll input is the preset value or more while the scroll input is entered to the screen, the processor 450 may be configured to abstain from displaying the plurality of objects on the other area of the scroll page than the at least one second object on the display 420.

According to an example embodiment of the present disclosure, the processor 450 may be configured to, when the speed of the scroll input is the preset value or more while the scroll input is entered to the screen, display, on the screen of the display 420, at least one preset replacement image smaller in volume than the plurality of objects on the other area of the scroll page than the at least one second object.

According to an example embodiment of the present disclosure, the plurality of objects may include at least one of, e.g., an image (e.g., a picture, still image, or video), multimedia data, voice data, text, list item, or any combination thereof.

According to an example embodiment of the present disclosure, the plurality of objects of the scroll page may be sorted in a preset order and displayed on the display.

According to an example embodiment of the present disclosure, the processor 450 may detect a direction and speed of the scroll input entered to the screen of the display 420 and determine whether the detected speed of the scroll input is the preset value or more. When the detected speed of the scroll input is the preset value or more, the processor 450 may split the scroll page into a plurality of blocks based on a screen size of the display 420 corresponding to the detected direction of the scroll input. The processor 450 may select, as a representative object, at least one first object among at least one object included in each of the blocks based on a representative object selection reference and generate at least one second object corresponding to the at least one selected first object based at least on information related to the at least one selected first object. The processor

450 may be configured to display the at least one generated second object on the display 420.

According to an example embodiment of the present disclosure, the processor 450 may be configured to determine a size for the plurality of blocks based on the detected speed of the scroll input.

According to an example embodiment of the present disclosure, the processor 450 may be configured to increase the size for the plurality of blocks corresponding to the direction of the scroll input as the detected speed of the scroll input increases.

According to an example embodiment of the present disclosure, the processor 450 may be configured to select the at least one selected first object from among the at least one object based on a representative object selection reference.

According to an example embodiment of the present disclosure, the representative object selection reference may include at least one of, e.g., the sorting turn of the object in each block, access count (e.g., view count or touch event count), whether corrected or not, whether shared with other application, whether user-designated or not, or any combination thereof.

According to an example embodiment of the present disclosure, the processor 450 may be configured to display the at least one second object in at least one of a position of the at least one selected first object, a central position of the screen, a position corresponding to a scroll bar as per the scroll input, or any combination thereof.

According to an example embodiment of the present disclosure, the electronic device 401 may further include a sound output device (e.g., the speaker 282). The processor 450 may be configured to, when the at least one second object includes voice data, output the voice data through the sound output device (e.g., the speaker 282) while the at least one second object is displayed on the screen of the display 420.

According to an example embodiment of the present disclosure, the processor 450 may be configured to keep on the at least one second object being displayed while the at least one position is present within the screen of the display 420.

According to an example embodiment of the present disclosure, the processor 450 may be configured to adjust at least one of a size or transparency of the at least one selected first object, or a combination thereof, to generate the at least one second object and display the at least one generated first object on the display 420.

According to an example embodiment of the present disclosure, the display 420 may include a TSP 425 for receiving the scroll input.

According to an example embodiment of the present disclosure, the electronic device 401 may further include an input device 430 for receiving the scroll input.

Figure 5:
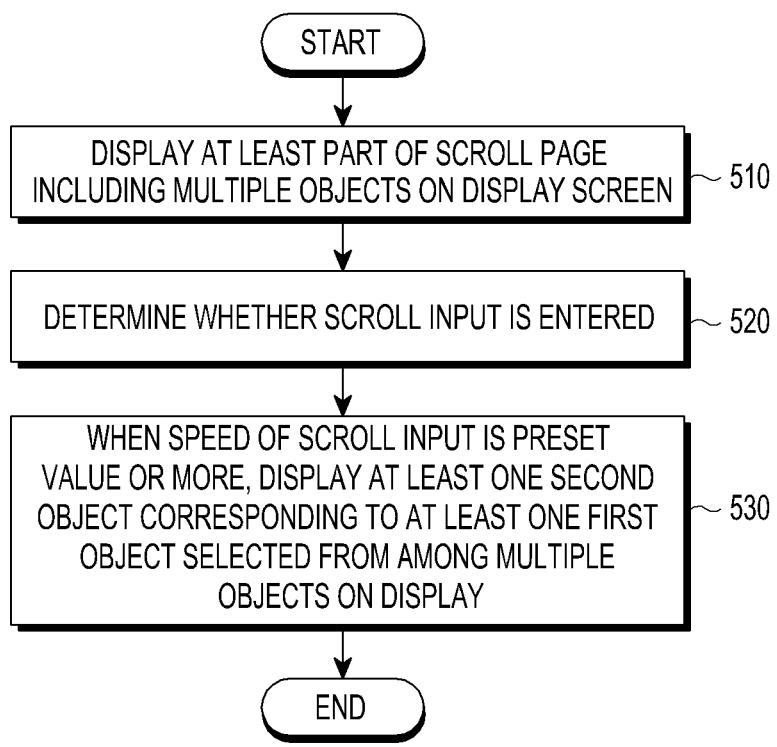
FIG. 5 is a flowchart illustrating a method for displaying a screen by an electronic device according to an embodiment of the present disclosure.

FIG. 5 is a flowchart illustrating a method for displaying a screen by an electronic device according to an example embodiment of the present disclosure. The screen displaying method may include operations 510 to 530. The screen displaying method may be performed by at least one of an electronic device (e.g., the electronic device 401/201/101) or a processor 450/210/120 of the electronic device.

In operation 510, the electronic device may display at least part of a page (e.g., a list view, application page, or webpage) including a plurality of objects on a display (e.g., the display 420), for example. For example, the electronic device may display, on the display screen, at least a portion of a scroll page including a plurality of objects (e.g., pictures, images, or videos) stored in a memory (e.g., the memory 440) of the electronic device upon running a picture-related application (e.g., a gallery or album application). The electronic device may display, on the display screen, at least a portion of a scroll page including a plurality of objects (e.g., text documents or list items, e.g., news articles) stored in the memory of the electronic device upon running a news or information search-related application.

In operation 520, the electronic device may determine whether a scroll input is entered, to the display screen for example. For example, the electronic device may determine whether the page including the plurality of objects is larger in size than the display screen. When the page size is determined to be larger than the display screen, the electronic device may generate at least one scroll bar having a predetermined scrolling direction(s) according to the page size and display the scroll bar on the screen. When the at least one scroll bar is generated, the electronic device may determine whether a scroll input is generated according to an operation of the scroll bar. When the scroll bar is operated by the user, the electronic device may receive a scroll input according to the operation of the scroll bar through a predetermined input device (e.g., the input device 430, e.g., a mouse or keyboard) or a touchscreen panel (e.g., the TSP 425). The electronic device may periodically or aperiodically determine whether a scroll input is generated.

In operation 530, when the speed of the scroll input is a preset value or more while the scroll input is entered to the display screen, the electronic device may display, on the display, at least one second object corresponding to at least one first object selected from among the plurality of objects, for example. For example, the electronic device may determine at least one of, e.g., the position of the at least one selected first object, a central position of the screen, a position corresponding to the generated scroll bar, or any combination thereof. The electronic device may adjust at least one of, e.g., the size or transparency of the at least one first object selected, or a combination thereof, generating the at least one second object. The electronic device may perform reconfiguration based on information extracted from any one of the property information, tag information, analysis information, or any combination thereof, about the at least one selected first object selected, thereby generating the at least one second object. The electronic device may display the at least one generated second object in the at least one determined position. The at least one second object may include at least one of, e.g., an image, text, voice data, or any combination thereof. The voice data may be voice data included in at least one of, e.g., the property information, tag information, or analysis information about the at least one first object. The voice data may include, e.g., voice data (e.g., text-to-speech (TTS) data) corresponding to text reconfigured based on information extracted from at least part of the property information, tag information, analysis information, or a combination thereof of the at least one first object.

Figure 6:
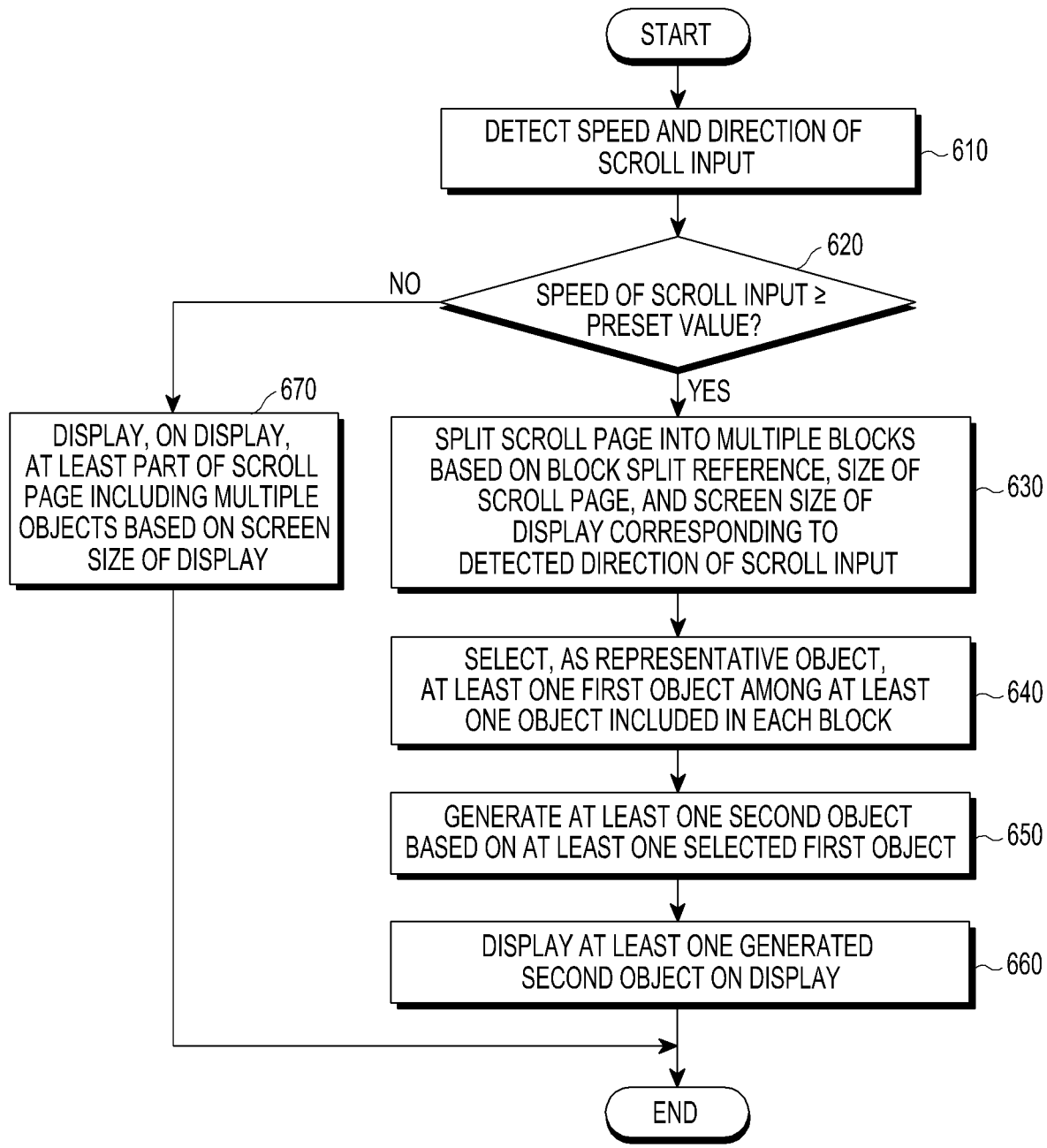
FIG. 6 is a flowchart illustrating a method for displaying a screen by an electronic device according to an embodiment of the present disclosure.

FIG. 6 is a flowchart illustrating a method for displaying a screen by an electronic device according to an example embodiment of the present disclosure. FIG. 6 illustrates an example of operation 530 of FIG. 5 which may include operations 610 to 670. The screen displaying method may be performed by at least one of an electronic device (e.g., the electronic device 401, 201, or 101) or a processor (e.g., the processor 120, 210, or 450) of the electronic device.

In operation 610, the electronic device may detect a scroll input entered to the screen of a display (e.g., the display 420) of the electronic device that displays at least a portion of a scroll page including a plurality of objects (e.g., images, e.g., pictures, still images, or videos, multimedia data, voice data, text, or list items), for example. The scroll input may be via a mouse, keypad, touchpad, or the like, and may be on a scroll bar portion of the screen or elsewhere on the screen via a swipe or the like, or may be via a keypad.

For example, the electronic device may detect the speed and direction of the scroll input (e.g., how fast a finger swipe occurs, or how fast a block in a scroll bar is moved via a mouse or the like). The direction of the scroll input may be detected based on the size of the scroll page and the screen size of the display. For example, when the vertical (e.g., y-axis direction) size of the scroll page is larger than the vertical (e.g., y-axis direction) screen size of the display, a scroll bar may be generated in the vertical direction of the display. In this case, the detected direction of the scroll input may be the vertical (y-axis) direction of the display. For example, when the horizontal (e.g., x-axis direction) size of the scroll page is larger than the horizontal (e.g., x-axis direction) screen size of the display, a scroll bar may be generated in the horizontal direction of the display. In this case, the detected direction of the scroll input may be the horizontal (x-axis) direction of the display. The electronic device may detect the scroll input through a touchscreen panel (e.g., the TSP 425) of the display. The electronic device may also detect the scroll input through an input device (e.g., the input device 430/250) of the electronic device, such as via a mouse or stylus.

In operation 620, the electronic device may determine whether the detected speed of the scroll input is a preset value or more, for example. The preset value may be previously set or designated by the user. When the detected speed of the scroll input is the preset value or more in operation 620, then the scroll speed is generally considered to be fast or quick and the electronic device may perform operation 630, and when the detected speed of the scroll input is less than the preset value, the electronic device may perform operation 670.

In operation 630, when the detected speed of the scroll input is the preset value or more, the electronic device may split the scroll page including the plurality of objects into a plurality of blocks based on one or more of the screen size of the display corresponding to the detected direction of the scroll input, the size of the scroll page, and a block split reference. For example, the processor 450 may determine the size of the blocks considering the size of the scroll page and the screen size of the display 420 corresponding to the direction of the scroll input. For example, the size of the blocks may be set to be larger than the screen of the display 420 corresponding to the direction of the scroll input. The electronic device may split the scroll page into a plurality of blocks based on the block split reference.

According to an example embodiment of the present disclosure, the block split reference may include at least one of, e.g., time information, place information, figure information, capturing device information, tag information, or a combination thereof based on the number of designated objects for each block, the number of designated blocks, the size of designated block, the time when the object was created, or the time when the object was changed.

For example, the electronic device may split the scroll page into a plurality of blocks based on the number of designated objects for the plurality of objects included in the scroll page or the number of designated blocks for the plurality of blocks among the block split references. The electronic device may split the scroll page into a plurality of blocks based on the designated block size for the blocks.

According to an example embodiment of the present disclosure, the number of designated objects or the number or size of blocks may be set to differ depending on, e.g., the speed of the detected scroll input. For example, as the speed of the detected scroll input increases, the electronic device may set the number of designated objects to increase. As the speed of the scroll input increases, the processor 450 may set the number of designated blocks to reduce. As the speed of the scroll input increases, the processor 450 may set the size of the designated blocks to increase.

According to an example embodiment of the present disclosure, the electronic device may split the scroll page into a plurality of blocks based on the time when the object was crated or the time when the object was changed among the block split references. For example, the electronic device may divide the plurality of objects in the scroll page per year/month/day/hour based on the time created or time changed included in the property information of the meta information of the object, thereby splitting the scroll page into a plurality of blocks.

According to an example embodiment of the present disclosure, the electronic device may split the scroll page into a plurality of blocks based on one or more of the place information, figure information, and capturing device information among the block split references. For example, the electronic device may divide the plurality of objects in the scroll page per figure, place, or capturing device based on the place information or capturing device information included in the property information of the meta information of the object, thereby splitting the scroll page into a plurality of blocks. Among the block split references, the figure information or place information may include figure information or place information included in the analysis information, obtained using a face or object recognition scheme, of the meta information on the object.

According to an example embodiment of the present disclosure, the electronic device may split the scroll page into a plurality of blocks based on the tag information among the block split references. For example, the electronic device may divide the plurality of objects in the scroll page per tagging information based on the information tagged in relation with the object included in the tag information of the meta information about the object, splitting the scroll page into a plurality of blocks.

For example, the plurality of blocks split based on the number of designated objects, the number of designated blocks, and the size of designated blocks among the block split references may have the same size. The plurality of blocks split based on the tag information, capturing device information, figure information, place information, and time information based on the time when the object was created or changed among the block split references may have different sizes.

In operation 640, the electronic device may select at least one first object among at least one object included in each block as a representative object, for example.

For example, the electronic device may select, as a representative object, the at least one selected first object among the at least one object included in each block based on a representative object selection reference.

According to an example embodiment of the present disclosure, the representative object selection reference may include at least one of, e.g., the sorting turn of the object in each block, access count (e.g., view count or touch event count), whether corrected or not, whether shared with other application, whether user-designated or not, or any combination thereof.

For example, the electronic device may select, as the representative object, the first object corresponding to a designated sorting turn among the at least one object in each block. The electronic device may select, as the representative object, the first object most accessed among the at least one object in each block based on, e.g., the property information (e.g., time accessed or access count) about the object. The electronic device may select, as the representative object, a corrected first object or a first object corrected latest among the at least one object in each block based on the property information (e.g., time changed) about the object. The electronic device may select, as the representative object, a first object used by another application (e.g., shared with the other application), such as a background or social media application, among the at least one object in each block based on the property information (e.g., share information) about the object. The electronic device may select, as the representative object, a first object designated by the user among the at least one first object in each block based on the property information (e.g., tag information) about the object. The first object designated by the user may previously be set and included in the tag information.

In operation 650, the electronic device may generate at least one second object corresponding to the at least one first object based on at least information related to the at least one selected first object, for example.

According to an example embodiment of the present disclosure, the electronic device may adjust at least one of, e.g., the size or transparency of the at least one first object selected, or a combination thereof, generating the at least one second object.

According to an example embodiment of the present disclosure, the electronic device may generate the at least one second object based on the meta information about the at least one first object selected. For example, the electronic device may perform reconfiguration based on information extracted from at least part of the property information, tag information, analysis information, or any combination thereof included in the meta information about the at least one first object selected, thereby generating the at least one second object.

The at least one second object may include at least one of, e.g., an image, text, voice data, or any combination thereof. The voice data may be voice data included in at least one of, e.g., the property information, tag information, or analysis information about the at least one first object. The voice data may include voice data (e.g., text-to-speech (TTS) data) corresponding to text reconfigured based on information extracted from at least part of the property information, tag information, analysis information, or a combination thereof of the at least one first object.

According to an example embodiment of the present disclosure, the property information may include one or more of, e.g., the name (e.g., a file name) of the object, format (e.g., image (e.g., JPG, GIF, TIF, or BMP), video (e.g., AVI, WMW, MPEG, MPG, or MKV), document (e.g., DOC, PPT, or PDF), size, volume, time created, time changed, time accessed, access count (e.g., view count or touch event count), access authority, owner information (e.g., owner, owner group, or other users), information about capture place (e.g., geographical location information or GPS positioning information), information about capturing device (e.g., camera information), information about sharing (e.g., whether it is shared with other application), or any combination thereof.

According to an example embodiment of the present disclosure, the tag information may be information tagged in relation to the object, and the tag information may include at least one of, e.g., a keyword automatically extracted from the property information about the object by the electronic device, a keyword entered by the user, or any combination thereof. The tag information may be included in the property information.

According to an example embodiment of the present disclosure, the analysis information may include at least one of, e.g., information analyzed from the object, information extracted from the property information about the object, or information reconfigured based on the analyzed information and the extracted information. When the object is an image, the information analyzed from the object may include at least one of, e.g., figure information recognized by a scheme for recognizing a face or object in the image, object information, or place information analyzed based on the object information. For example, when the object is a picture, image, or video, the electronic device may analyze a figure, building, or place included in the object using the face or object recognition scheme.

In operation 660, the electronic device may display the at least one generated second object on the display, for example.

For example, the electronic device may display the at least one second object in the position of the at least one selected first object (i.e., the representative object), a central position of the screen, a position corresponding to the scroll bar as per the scroll input, or any combination thereof. For example, the electronic device may generate the at least one second object adjusted according to at least one of the size, transparency, or a combination thereof, of the at least one selected first object (i.e., representative object) in the at least one position and display the at least one generated second object on the display. The electronic device may display, on the display, the at least one second object reconfigured based on information extracted from any one of the property information, tag information, analysis information, or a combination thereof, about the at least one selected first object (i.e., representative object) in the at least one position.

When the speed of the scroll input is the preset value or more while the scroll input is entered to the screen, the electronic device may abstain from displaying the plurality of objects on the other area of the scroll page than the at least one second object. In other words, the electronic device may not load the plurality of objects and may leave the other area of the scroll page than the at least one second object as an empty space.

When the speed of the scroll input is the preset value or more while the scroll input is entered to the screen, the electronic device may display at least one preset replacement image for the other area of the scroll page than where the at least one second object is on the display screen. The at least one preset replacement image may have a relatively tiny volume as compared with the plurality of objects.

When the at least one second object includes voice data, such an operation may further be included where the electronic device outputs the voice data through a predetermined sound output device (e.g., the speaker 282) while the at least one second object is displayed on the display screen. Examples of the display screen displaying the at least one second object are described below in greater detail with reference to FIGS. 7a to 13.

In operation 670, when the detected speed of the scroll input is a preset value or less, the electronic device may display, on the display, at least a portion of the scroll page including the plurality of objects based on the screen size of the display, for example. For example, the electronic device may previously load at least one object corresponding to the screen size of the display corresponding to the scroll input among the plurality of objects in the scroll page and display the objects on the display screen.

According to an example embodiment of the present disclosure, a method for controlling scroll by an electronic device (e.g., the electronic device 401) may comprise displaying at least a portion of a scroll page including a plurality of objects on a screen of a display 420 of the electronic device, and when a speed of a scroll input is a preset value or more while the scroll input is entered to the screen, displaying, on the display, at least one second object corresponding to at least one first object selected from among the plurality of objects.

According to an example embodiment of the present disclosure, splitting the scroll page into the plurality of blocks may include determining a size for the plurality of blocks based on the detected speed of the scroll input.

According to an example embodiment of the present disclosure, splitting the scroll page into the plurality of blocks may include splitting the scroll page into the plurality of blocks based on the screen size of the display 420 corresponding to the direction of the scroll input, the size of the scroll page, and a block split reference. According to an example embodiment of the present disclosure, selecting the at least one first object may include selecting, as a representative object, at least one first object among at least one object in each block based on a representative object selection reference.

According to an example embodiment of the present disclosure, the representative object selection reference may include at least one of, e.g., the sorting turn of the object in each block, access count (e.g., view count or touch event count), whether corrected or not, whether shared with other application, whether user-designated or not, or any combination thereof.

According to an example embodiment of the present disclosure, displaying the at least one second object on the display may include determining at least one of a position of the at least one selected first object, a central position of the screen, a position corresponding to a scroll bar as per the scroll input, or any combination thereof and displaying the at least one generated second object in the determined position.

According to an example embodiment of the present disclosure, the method may further comprise adjusting at least one of a size or transparency of the at least one selected first object, or a combination thereof, to generate the at least one second object.

Figure 7A:
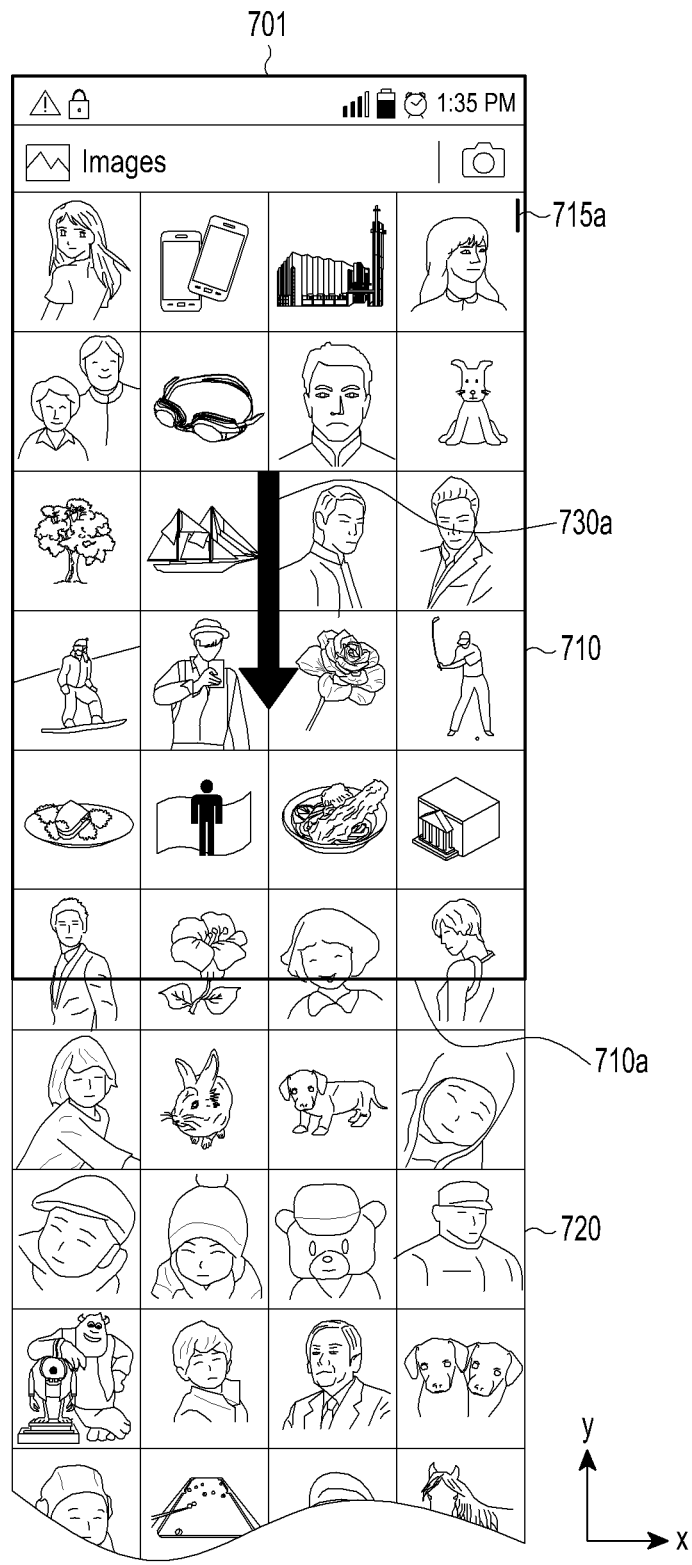
FIGS. 7a and 7b are views illustrating a scroll page and a scroll input on a display of an electronic device according to an embodiment of the present disclosure.
Figure 7B:
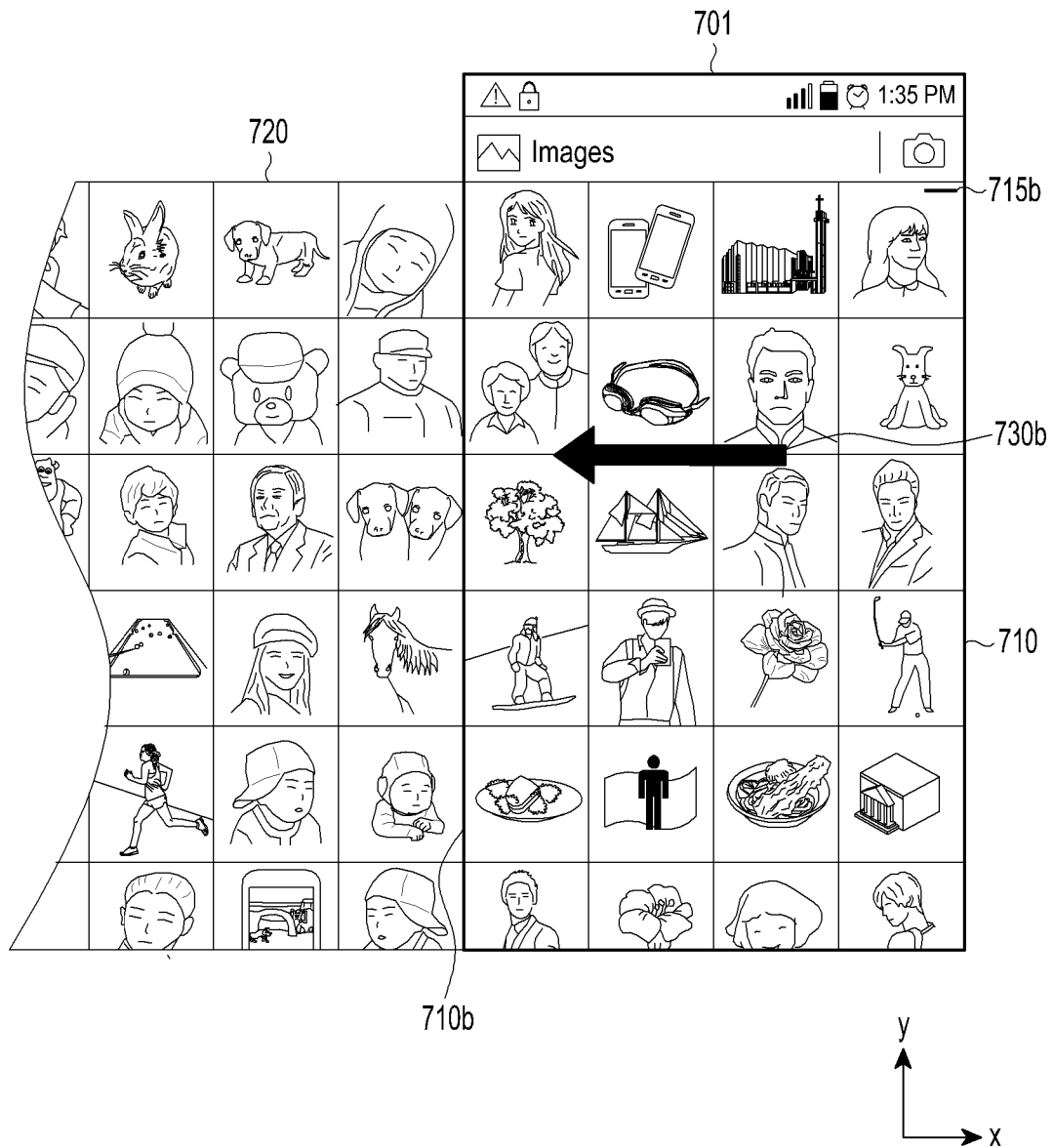

FIGS. 7a and 7b are views illustrating a scroll page and a scroll input on a display of an electronic device according to an example embodiment of the present disclosure. Referring to FIGS. 7a and 7b, the electronic device may include the whole or part of the electronic device 401, 201 and/or 101.

Referring to FIG. 7a, at least a portion of the scroll page 720 including a plurality of objects is displayed on the screen 710 of the display 701 (or 420, 260, 160) of the electronic device. The size of the scroll page 720 may be larger than the size of the screen 710. For example, the vertical (e.g., y-axis direction) size of the scroll page 720 is larger than the size of the screen 710 as shown in FIG. 7a. The bottom of the screen 710 is represented by line 710a in FIG. 7a. In this case, a scroll bar and/or block 715a that is to be scrolled in the vertical direction (e.g., y-axis direction) may be generated on the screen 710. The scroll bar 715a may be displayed on the screen 710 while the scroll input 730a is entered to the touchscreen panel (e.g., the TSP 425) of the display 701. The electronic device may detect the speed and direction (e.g., a +y-axis or −y-axis direction) of the scroll input 730a entered to the screen 710 of the display 701 through the TSP 425.

Referring to FIG. 7b, the horizontal (e.g., x-axis direction) size of the scroll page 720 may be larger than the size of the screen 710. Note that the FIGS. 7a and 7b embodiments may be combined in certain example embodiments. In the case of FIG. 7b, a scroll bar 715b that is scrolled in the horizontal direction (e.g., x-axis direction) may be generated on the screen 710. The left hand boundary of the screen 710 in FIG. 7b is represented by line 710b. The scroll bar 715b may be displayed on the screen 710 while the scroll input 730b is entered to the touchscreen panel (e.g., the TSP 425) of the display 701. Upon detecting the scroll input 730b entered to the screen 710 of the display 701, the electronic device may calculate the speed and direction (e.g., a +x-axis or −x-axis direction) of the scroll input 730b entered to the screen 710 of the display 701 through the TSP 425.

FIG. 8 illustrates screens displayed on a display upon scrolling in an electronic device according to an example embodiment of the present disclosure. Referring to FIG. 8, the electronic device may include the whole or part of the electronic device 401/201/101.

Figures 8A, 8B:
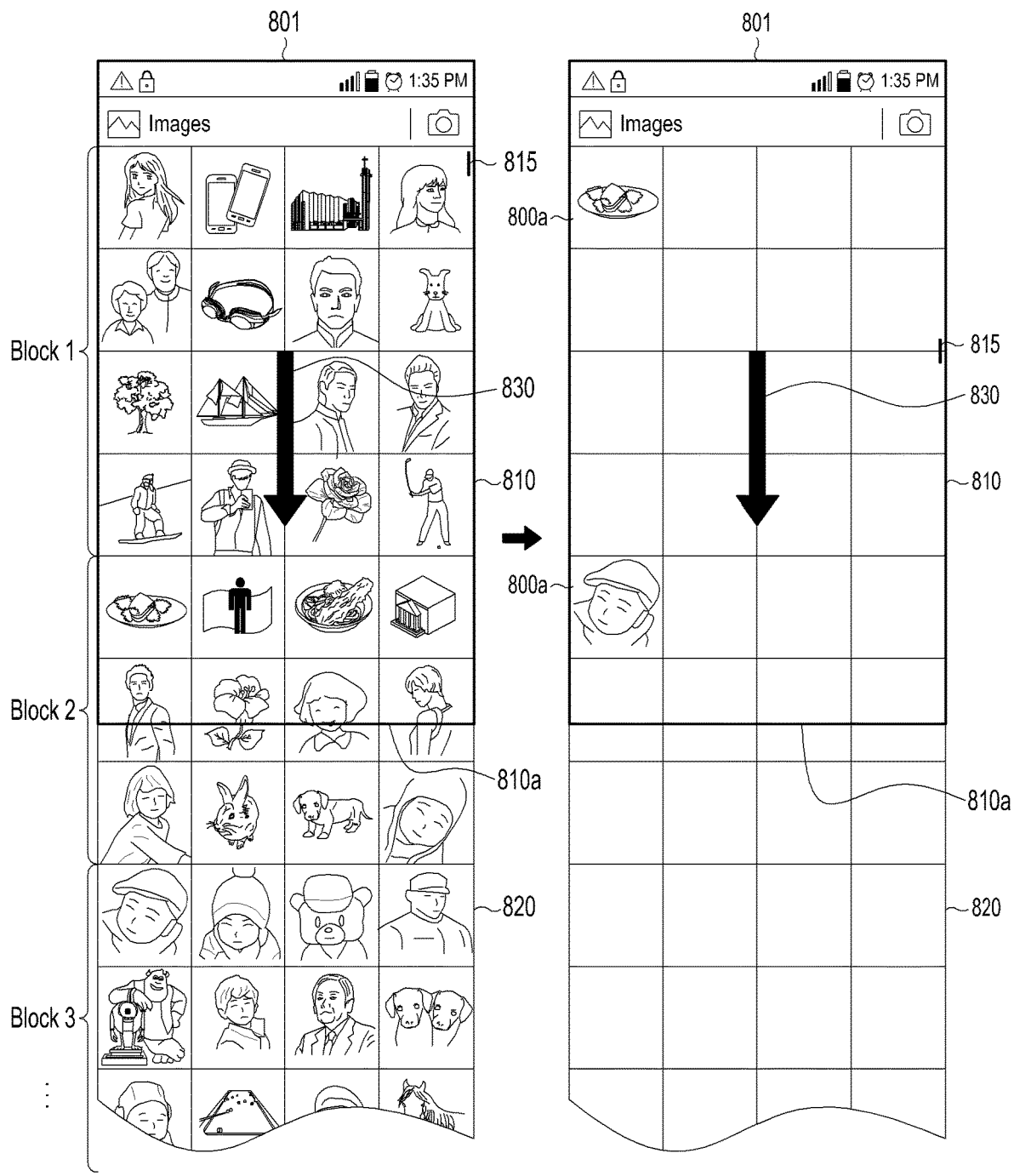
FIGS. 8a-8b illustrate a display upon scrolling in an electronic device according to an embodiment of the present disclosure.

Referring to FIGS. 8(a) and (b), at least a portion of the scroll page 820 including a plurality of objects may be displayed on the screen 810 of the display 801 of the electronic device. The bottom of the screen 810 is shown at line 810a. The scroll page 820 may thus be larger in size than the screen 810. Referring to FIG. 8, the vertical (e.g., y-axis direction) size of the scroll page 820 is assumed to be larger than the size of the screen 810. In this case, a scroll bar 815 that is scrolled in the vertical direction (e.g., y-axis direction) may be generated on the screen 810. FIG. 8(a) illustrates a screen 810 of a display 801 when the speed of a scroll input 830 entered to the screen 810 is less than a preset value, and FIG. 8(b) illustrates a screen 810 of a display 801 when the speed of a scroll input 830 entered to the screen 810 is a preset value or more, which is hereinafter referred to as 'fast scroll.'

Referring to FIG. 8(a), when the speed of the scroll input 830 is less than the preset value (i.e., a slow scroll input), all objects within the size of the screen 810 of the display 801, among the plurality of objects included in the scroll page 820 while the scroll input 830 is entered, are displayed on the screen 810.

Referring to FIG. 8(b), when the speed of the scroll input 830 is the preset value or more, i.e., fast scroll, at least one first object 800a (e.g., the representative object of each block) selected from among the plurality of objects included in the scroll page 820 while the scroll input 830 is entered may be displayed on the screen 810. And other objects, shown in FIG. 8(a) for instance, are not displayed on the screen 810 in FIG. 8(b). The at least one selected first object 800a may split the scroll page 820 including the plurality of objects into a plurality of blocks (e.g., Blocks 1 to 3 shown in FIG. 8) based on the representative object selection reference. The plurality of blocks Blocks 1 to 3 split may have the same or different sizes according to the block split reference. Referring to FIG. 8(b), the at least one selected first object 800a may be displayed in the original size in the original position, or the position may be modified.

Thus, upon rapid scrolling, only some selected (e.g., the at least one selected first object 800a), rather than all of the at least one object corresponding to the screen 810 of the display 801 among the plurality of objects in the scroll page, may be loaded and displayed on the screen 810, thereby enabling the scroll input 830 to remain in the rapid scrolling status while allowing the user to recognize the position scrolled and the objects 800*a* corresponding to the scroll input 830. By so doing, a sort of indexing function may be implemented.

Figures 9A, 9B:
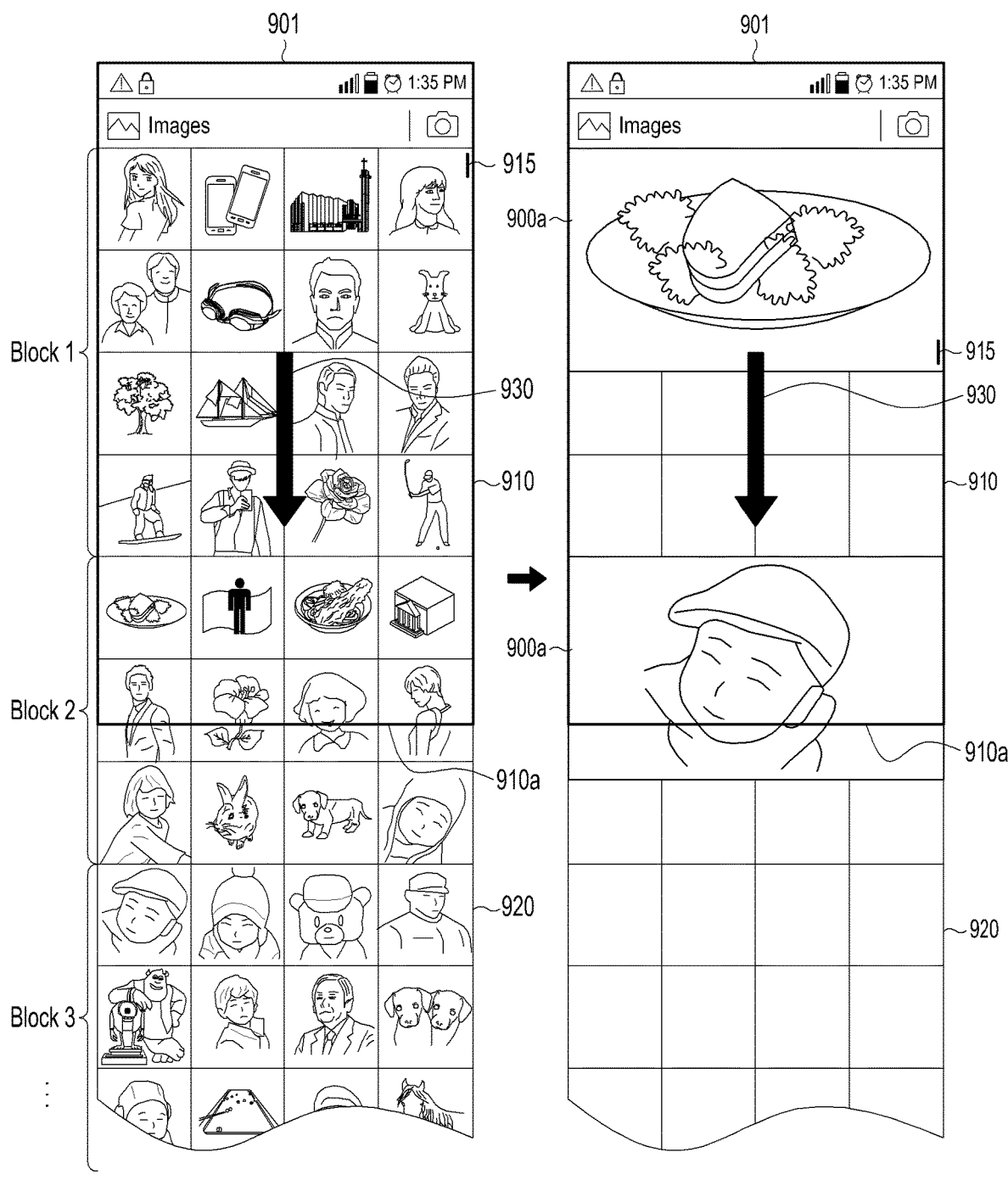
FIGS. 9a-9b illustrate screens displayed on a display upon scrolling in an electronic device according to an embodiment of the present disclosure.

FIG. 9 illustrates screens displayed on a display upon scrolling in an electronic device according to an embodiment of the present disclosure. Referring to FIG. 9, the electronic device may include the whole or part of the electronic device 401/201/101.

Referring to FIGS. 9(*a*) and (*b*), at least a portion of the scroll page 920 including a plurality of objects may be displayed on the screen 910 of the display 901 of the electronic device. The bottom of the screen 910 is shown at line 910*a*. The scroll page 920 may be larger in size than the screen 910. Referring to FIG. 9, the vertical (e.g., y-axis direction) size of the scroll page 920 is assumed to be larger than the size of the screen 910. In this case, a scroll bar 915 that is scrolled in the vertical direction (e.g., y-axis direction) may be generated on the screen 910. FIG. 9(*a*) illustrates a screen 910 of a display 901 when the speed of a scroll input 930 entered to the screen 910 is less than a preset value, and FIG. 9(*b*) illustrates a screen 910 of a display 901 when the speed of a scroll input 930 entered to the screen 910 is a preset value or more, which is referred to as 'fast scroll.'

Referring to FIG. 9(*a*), when the speed of the scroll input 930 is less than the preset value, all of the objects corresponding to the size of the screen 910 of the display 901 among the plurality of objects included in the scroll page 920 while the scroll input 930 is entered are displayed on the screen 910.

Referring to FIG. 9(*b*), when the speed of the scroll input 930 is the preset value or more, i.e., fast scroll, at least one first object 900*a* (e.g., the representative object of each block) selected from among the plurality of objects included in the scroll page 920 while the scroll input 930 is entered may be displayed on the screen 910. And other objects, shown in FIG. 9(*a*) for instance, are not displayed on the screen 910 in FIG. 9(*b*). The at least one selected first object 900*a* may split the scroll page 920 including the plurality of objects into a plurality of blocks (e.g., Blocks 1 to 3) based on the representative object selection reference. The plurality of blocks Blocks 1 to 3 split may have the same or different sizes according to the block split reference. Referring to FIG. 9(*b*), the at least one selected first object 900*a* each may be displayed at the center of the screen 910 in the original position of the selected first object 900*a*, thereby allowing the selected first object 900*a* to be enlarged and displayed.

Thus, upon rapid scrolling, only some selected (e.g., the at least one selected first object 900*a*), rather than all of the at least one object corresponding to the screen 910 of the display 901 among the plurality of objects in the scroll page, may be loaded and displayed at the center of the screen 910, enabling the scroll input 930 to remain in the rapid scrolling status while allowing the user to recognize the position scrolled and the objects 900*a* corresponding to the scroll input 930. By so doing, a sort of indexing function may be implemented.

Figures 10A, 10B:
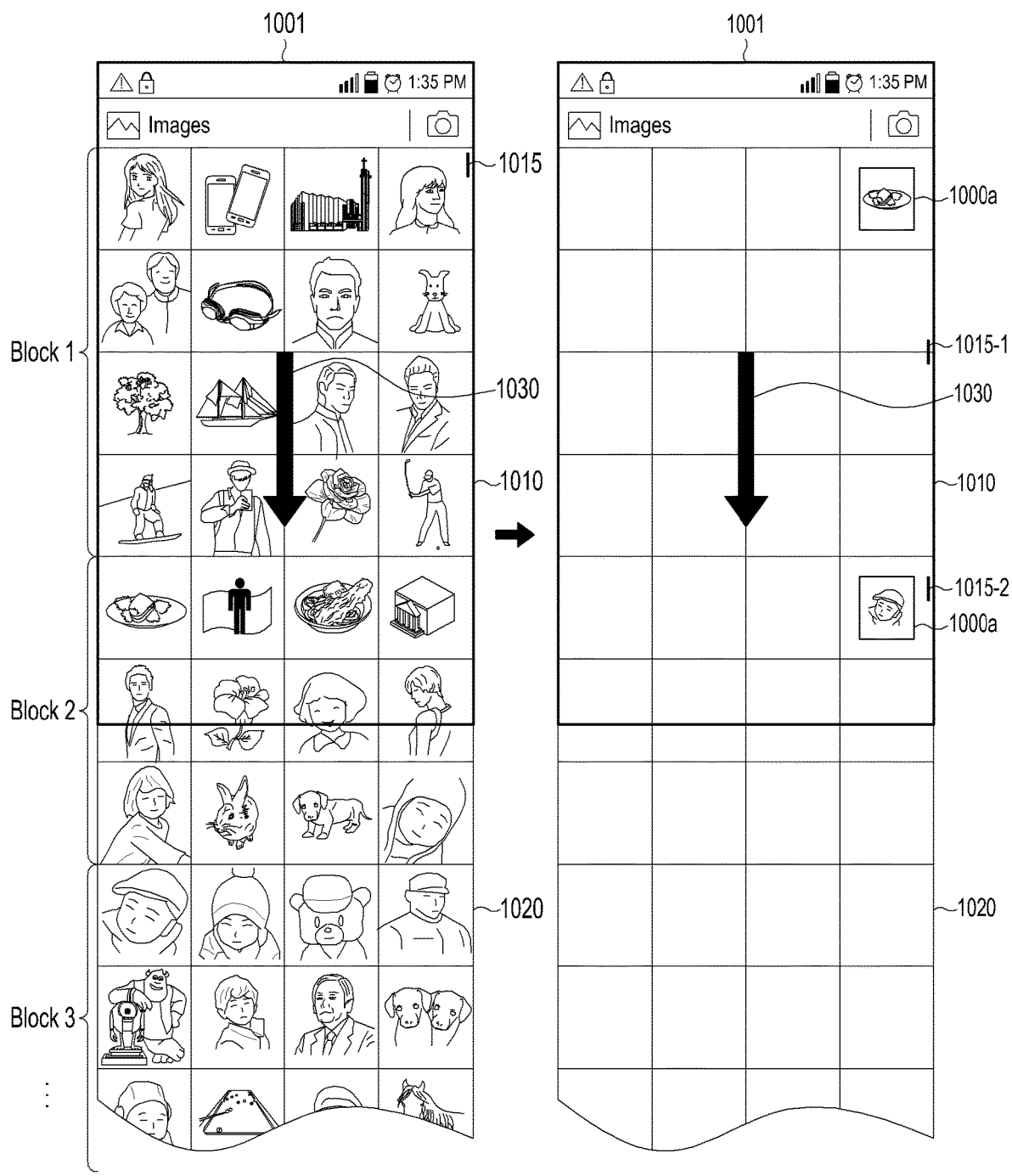
FIGS. 10a-10b illustrate screens displayed on a display upon scrolling in an electronic device according to an embodiment of the present disclosure.

FIG. 10 illustrates screens displayed on a display upon scrolling in an electronic device according to an example embodiment of the present disclosure. Referring to FIG. 10, the electronic device may include the whole or part of the electronic device 401/201/101.

Referring to FIGS. 10(*a*) and (*b*), at least a portion of the scroll page 1020 including a plurality of objects may be displayed on the screen 1010 of the display 1001 of the electronic device. The scroll page 1020 may be larger in size than the screen 1010. Referring to FIG. 10, the vertical (e.g., y-axis direction) size of the scroll page 1020 is larger than the vertical size of the screen 1010. In this case, a scroll bar 1015, 1015-1 and/or 1015-2 that is scrolled in the vertical direction (e.g., y-axis direction) may be generated on the screen 1010. FIG. 10(*a*) illustrates a screen 1010 of a display 1001 when the speed of a scroll input 1030 entered to the screen 1010 is less than a preset value, and FIG. 10(*b*) illustrates a screen 1010 of a display 1001 when the speed of a scroll input 1030 entered to the screen 1010 is a preset value or more, which is referred to as 'fast scroll.'

Referring to FIG. 10(*a*), when the speed of the scroll input 1030 is less than the preset value, all of the objects corresponding to the size of the screen 1010 of the display 1001 among the plurality of objects included in the scroll page 1020 while the scroll input 1030 is entered are displayed on the screen 1010.

Referring to FIG. 10(*b*), when the speed of the scroll input 1030 is the preset value or more, i.e., fast scroll, at least one first object 1000*a* (e.g., the representative object of each block) selected from among the plurality of objects included in the scroll page 1020 while the scroll input 1030 is entered may be displayed on the screen 1010. The at least one selected first object 1000*a* may split the scroll page 1020 including the plurality of objects into a plurality of blocks (e.g., Blocks 1 to 3) based on the representative object selection reference. The plurality of blocks Blocks 1 to 3 split may have the same or different sizes according to the block split reference. Referring to FIG. 10(*b*), the at least one selected object 1000*a* may be displayed in a position (e.g., on the left side of the scroll bar) corresponding to and/or adjacent to the scroll bar 1015-1 and/or 1015-2 that is repositioned by the scroll input 1030, and the at least one selected first object 1000*a* may be enlarged or shrunken and displayed. For example, the at least one first object 1000*a* may be adjusted to the size of a thumbnail in the FIG. 10(*b*) embodiment.

Thus, upon rapid scrolling, only some selected object(s) (e.g., the at least one selected first object 1000*a*), rather than all of the objects corresponding to the screen 1010 of the display 1001 among the plurality of objects in the scroll page, may be loaded and displayed in thumbnail size at and/or adjacent the scroll bar 1015-1 and/or 1015-2, enabling the scroll input 1030 to remain in the rapid scrolling status while allowing the user to recognize the position scrolled and the objects 1000*a* corresponding to the scroll input 1030. By so doing, a sort of indexing function may be implemented.

Figures 11A, 11B:
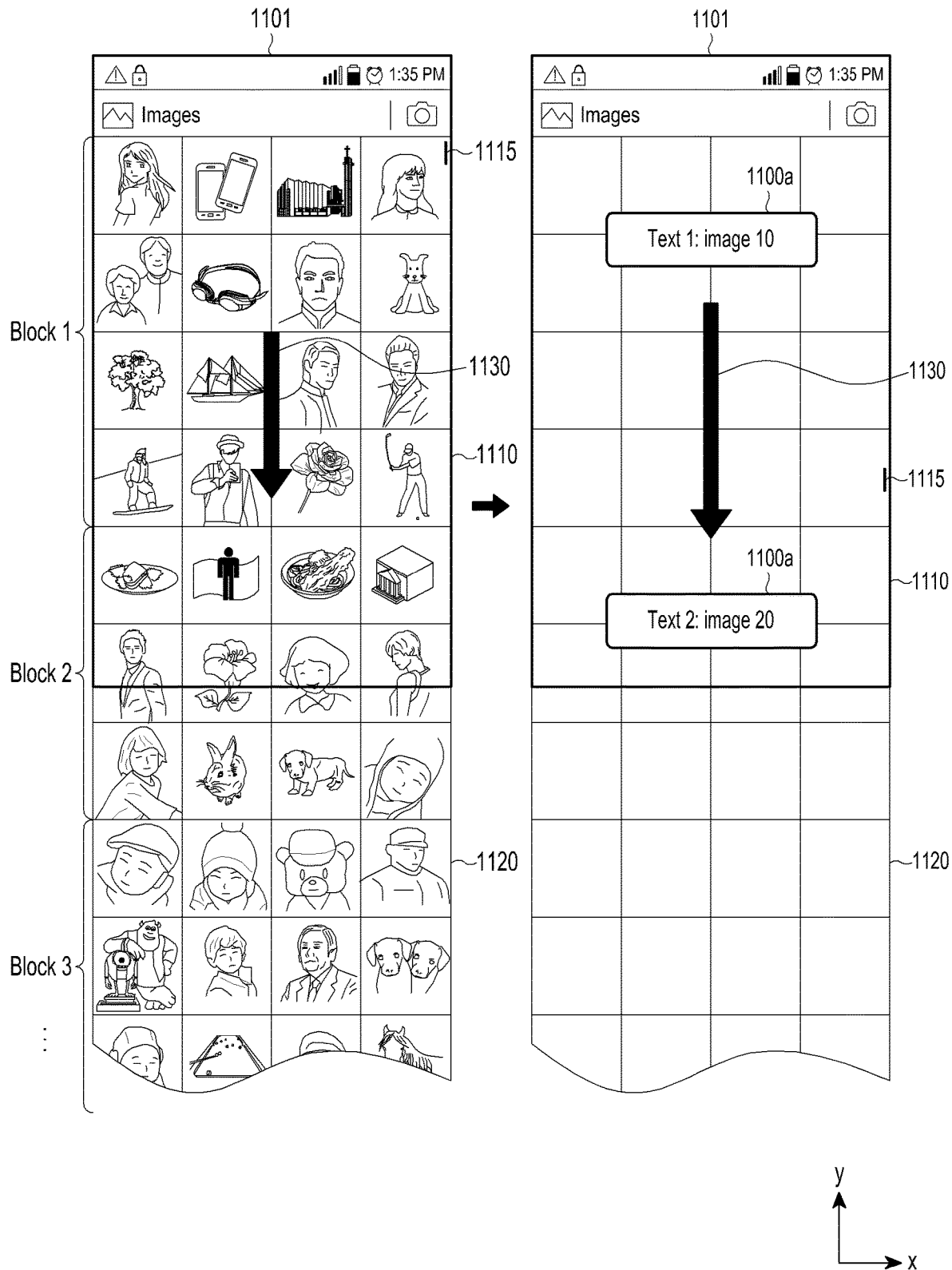
FIGS. 11a-11b illustrate screens displayed on a display upon scrolling in an electronic device according to an embodiment of the present disclosure.

FIG. 11 illustrates screens displayed on a display upon scrolling in an electronic device according to an embodiment of the present disclosure. Referring to FIG. 11, the electronic device may include the whole or part of the electronic device 401/201/101.

Referring to FIGS. 11(*a*) and (*b*), at least a portion of the scroll page 1120 including a plurality of objects may be displayed on the screen 1110 of the display 1101 of the electronic device. The scroll page 1120 may be larger in size than the screen 1110. Referring to FIG. 11, the vertical (e.g., y-axis direction) size of the scroll page 1120 is larger than the size of the screen 1110. In this case, a scroll bar 1115 that is scrolled in the vertical direction (e.g., y-axis direction) may be generated on the screen 1110. FIG. 11(*a*) illustrates a screen 1110 of a display 1101 when the speed of a scroll input 1130 entered to the screen 1110 is less than a preset value, and FIG. 11(*b*) illustrates a screen 1110 of the display 1101 when the speed of a scroll input 1130 entered to the screen 1110 is a preset value or more, which is referred to as 'fast scroll.'

Referring to FIG. 11(*a*), when the speed of the scroll input 1130 is less than the preset value, all of the objects corresponding to the size of the screen 1110 of the display 1101, among the plurality of objects included in the scroll page 1120 while the scroll input 1130 is entered, are displayed on the screen 1110.

Referring to FIG. 11(*b*), when the speed of the scroll input 1130 is the preset value or more, i.e., fast scroll, a second object 1100*a* (e.g., Text 1 or Text 2) generated based on at least one first object (e.g., image 10 or image 20, respectively) selected from among the plurality of objects included in the scroll page 1120 while the scroll input 1130 is entered may be displayed on the screen 1110. The second object 1100*a* corresponding to the first object (e.g., image 10 or image 20) (the representative object of each block) may be displayed on the screen 1110. The at least one second object 1100*a* (e.g., Text 1 or Text 2) may split the scroll page 1120 including the plurality of objects into a plurality of blocks (e.g., Blocks 1 to 3) based on the representative object selection reference. The plurality of blocks Blocks 1 to 3 split may have the same or different sizes according to the block split reference. Referring to FIG. 11(*b*), the second object 1100*a* (e.g., Text 1 or Text 2) generated based at least on the at least one selected object (e.g., image 10 or image 20) may be displayed on the center of the screen 1110. The second objects 1100*a* in the FIG. 11(*b*) embodiment include Text 1 and Text 2, respectively, and optionally may also include image(s) or portions thereof, such as Image 10 or Image 20, upon which they are based.

Thus, upon rapid scrolling, the second object 1100*a* (e.g., Text 1 or Text 2) generated based on the at least one selected first object (e.g., image 10 or image 20 from the original shown in FIG. 11(*a*)) may be displayed without loading all objects corresponding to the screen 1110 of the display 1101 among the plurality of objects in the scroll page. Thus, the speed of the scroll input 1130 may remain in the rapid scrolling state while allowing the user to recognize the position of scroll and the first object (e.g., image 10 or image 20) through the second object 1100*a* (e.g., Text 1 or Text 2) generated based on the at least one selected first object (e.g., image 10 or image 20) corresponding to the scroll input 1130. Thus, a sort of indexing function may be implemented.

Figure 12A:
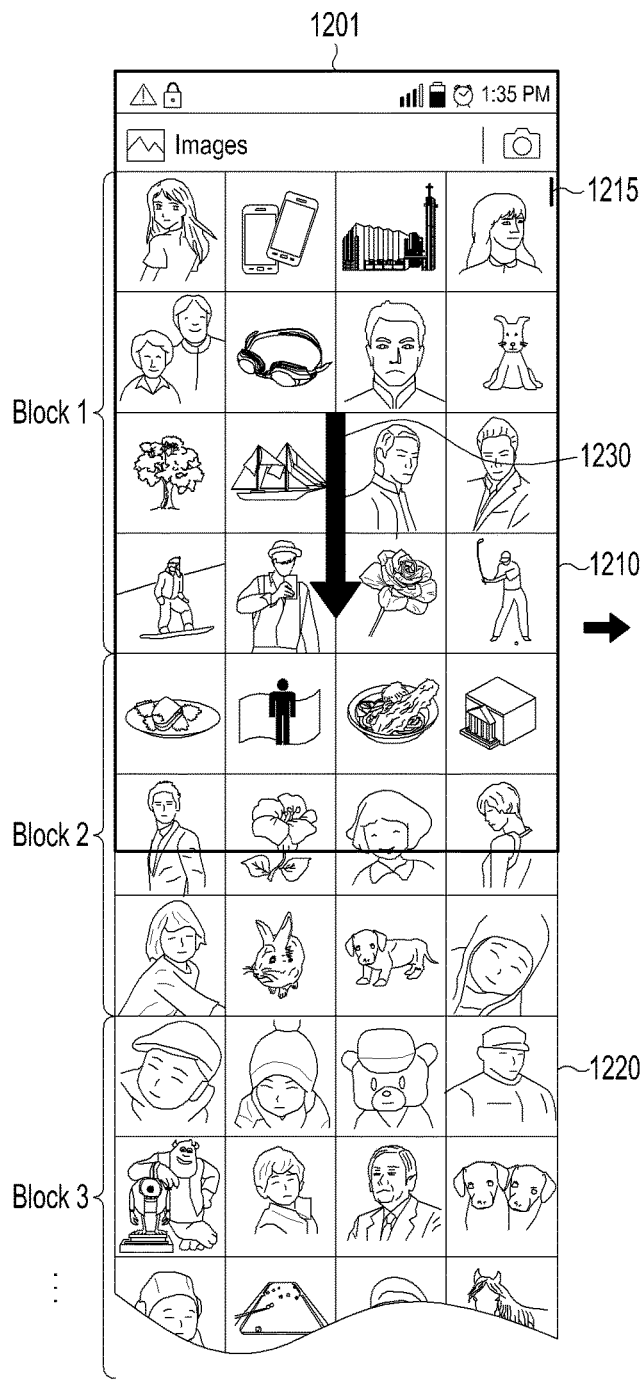
FIGS. 12a-12b illustrate screens displayed on a display upon scrolling in an electronic device according to an embodiment of the present disclosure.
Figure 12B:
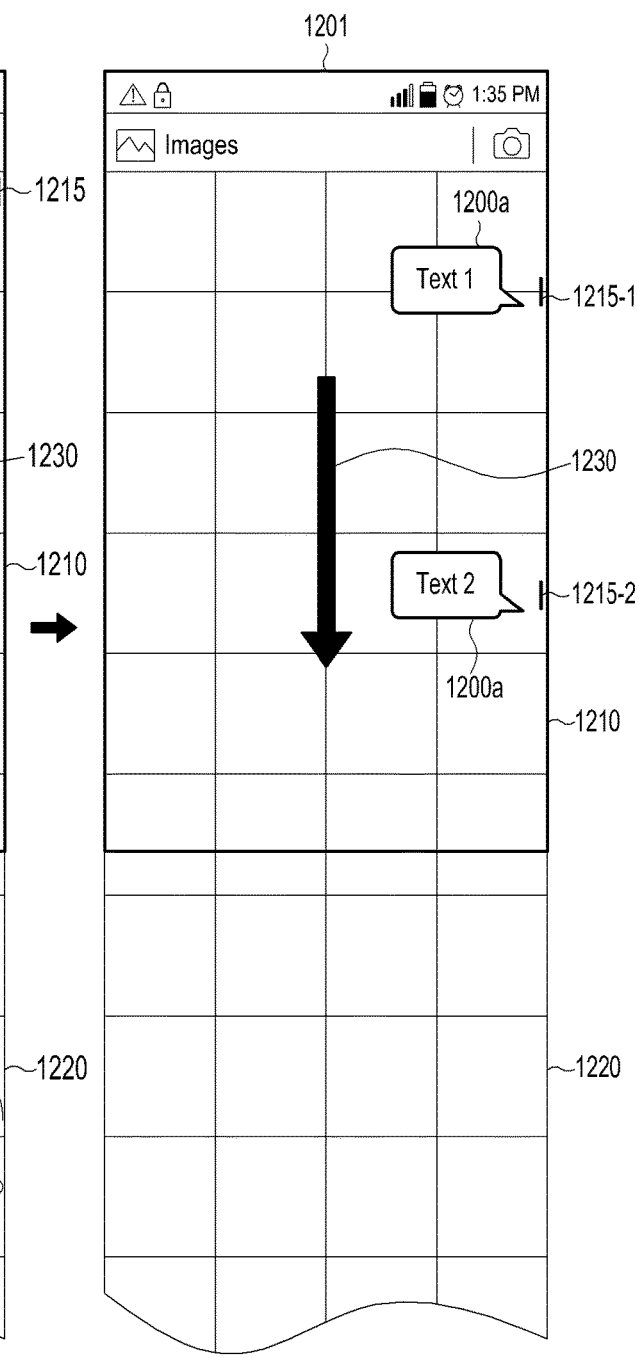

FIG. 12 illustrates screens displayed on a display upon scrolling in an electronic device according to an example embodiment of the present disclosure. Referring to FIG. 12, the electronic device may include the whole or part of the electronic device 401/201/101.

Referring to FIGS. 12(*a*) and (*b*), at least a portion of the scroll page 1220 including a plurality of objects may be displayed on the screen 1210 of the display 1201 of the electronic device. The scroll page 1220 may be larger in size than the screen 1210. Referring to FIG. 12, the vertical (e.g., y-axis direction) size of the scroll page 1220 is larger than the vertical size of the screen 1210. In this case, a scroll bar 1215, 1215-1 and/or 1215-2 that is scrolled in the vertical direction (e.g., y-axis direction) may be generated on the screen 1210. FIG. 12(*a*) illustrates a screen 1210 of a display 1201 when the speed of a scroll input 1230 entered to the screen 1210 is less than a preset value. And FIG. 12(*b*) illustrates a screen 1210 of a display 1201 when the speed of a scroll input 1230 entered to the screen 1210 is a preset value or more, which is referred to as 'fast scroll.'

Referring to FIG. 12(*a*), when the speed of the scroll input 1230 is less than the preset value, all object(s) corresponding to the size of the screen 1210 of the display 1201 among the plurality of objects included in the scroll page 1220 while the scroll input 1230 is entered are displayed on the screen 1210.

Referring to FIG. 12(*b*), when the speed of the scroll input 1230 is the preset value or more, i.e., fast scroll, a second object 1200*a* (e.g., Text 1 or Text 2) generated based on at least one first object (e.g., the first objects 800*a* of FIGS. 8(*a*) and 8(*b*)) selected from among the plurality of objects included in the scroll page 1220 while the scroll input 1230 is entered may be displayed on the screen 1210. For example, the second object 1200*a* (e.g., Text 1 or Text 2) may be generated in a thumbnail size, or a size smaller than the second object 1100*a* of FIG. 11(*b*). The at least one selected first object 800*a* (e.g., see the first objects 800*a* of FIG. 8(*b*), which originally appeared in FIG. 8(*a*)) may split the scroll page 1220 including the plurality of objects into a plurality of blocks (e.g., Blocks 1 to 3) based on the representative object selection reference. The plurality of blocks Blocks 1 to 3 split may have the same or different sizes according to the block split reference. Referring to FIG. 12(*b*), the second object 1200*a* (e.g., Text 1 or Text 2) generated based on the at least one selected first object (e.g., image 10 or image 20, which may be for example the images referred to as 800*a* in FIGS. 8(*a*)-8(*b*)) may be displayed in a position (e.g., on the left side of the scroll bar) corresponding to the scroll bar 1215-1 and/or 1215-2 that is repositioned by the scroll input 1230. Even after the scroll bar has been moved from the position 1215-1 to the position 1215-2, the at least one second object 1200*a* may be displayed on the display screen while the second object 1200*a* is present on the screen corresponding to the scroll bar. Thus, after the scroll bar is moved from the position 1215-1 to the 1215-2, the plurality of second objects 1200*a* together may be displayed on the screen 1210.

Thus, upon rapid scrolling, the second object(s) 1200*a* (e.g., Text 1 or Text 2) generated based on some selected (e.g., the first objects 800*a* of FIG. 8(*b*)) may be displayed in thumbnail size at the scroll bar 1215-1 or 1215-2 without loading all of the at least one object corresponding to the screen 1210 of the display 1201 among the plurality of objects in the scroll page. Thus, the speed of the scroll input 1230 may remain in the rapid scrolling state while allowing the user to recognize the position of scroll and the first object (e.g., the first objects 800*a* of FIG. 8(*b*)) through the second object 1200*a* (e.g., Text 1 or Text 2) generated based on the at least one selected first object (e.g., the first objects 800*a* of FIG. 8(*b*)) corresponding to the scroll input 1230. Thus, a sort of indexing function may be implemented.

Figures 13A, 13B:
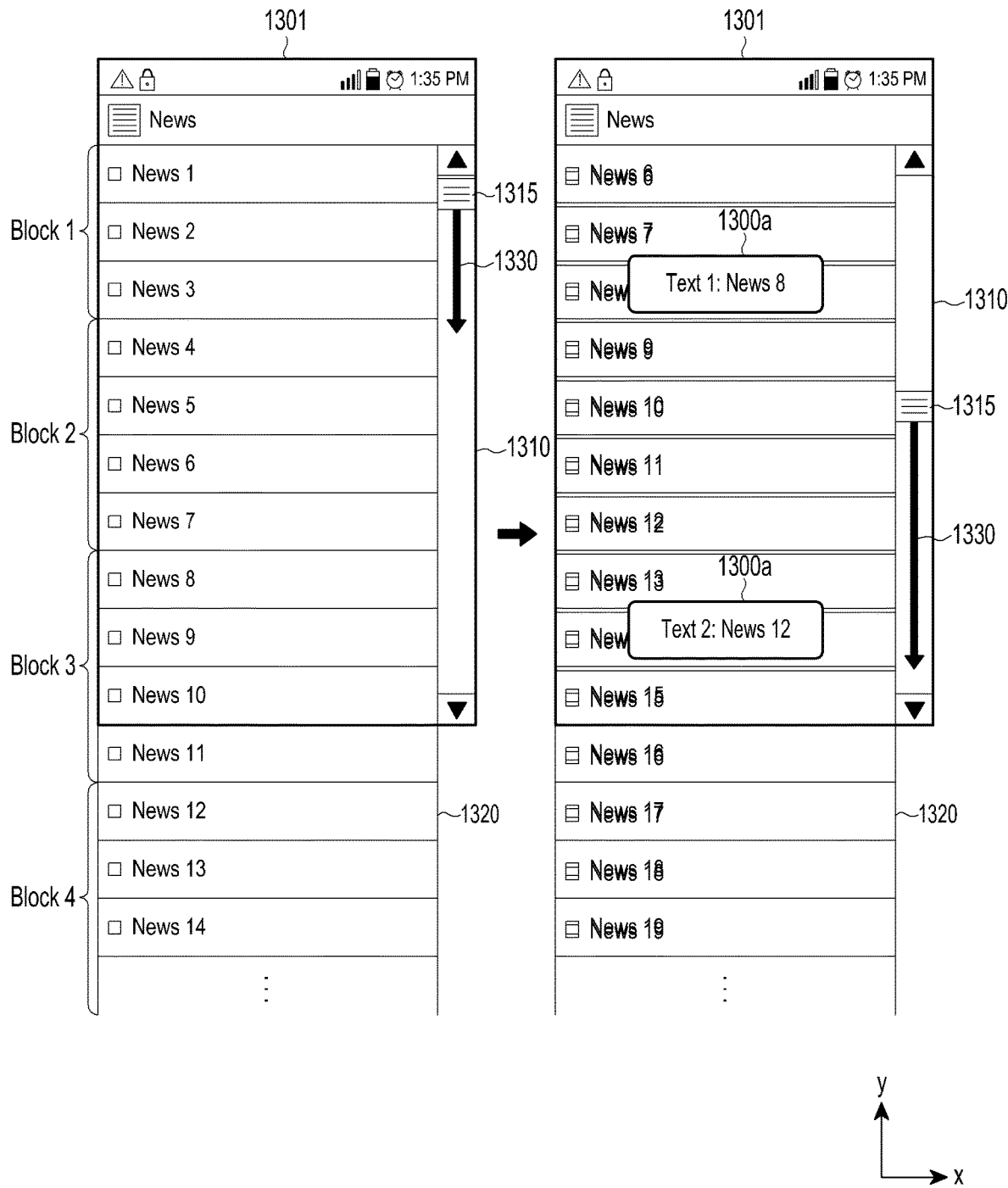
FIGS. 13a-13b illustrate screens displayed on a display upon scrolling in an electronic device according to an embodiment of the present disclosure.

FIG. 13 illustrates screens displayed on a display upon scrolling in an electronic device according to an example embodiment of the present disclosure. Referring to FIG. 13, the electronic device may include the whole or part of the electronic device 401/201/101.

Referring to FIGS. 13(*a*) and 13(*b*), at least a portion of the scroll page 1320 including a plurality of objects (e.g., list items, e.g., news articles) may be displayed on the screen 1310 of the display 1301 of the electronic device. The scroll page 1320 may be larger in size than the screen 1310. Referring to FIG. 13, the vertical (e.g., y-axis direction) size of the scroll page 1320 is larger than the vertical size of the screen 1310. In this case, a scroll bar 1315 that is scrolled in the vertical direction (e.g., y-axis direction) may be generated on the screen 1310. FIG. 13(*a*) illustrates a screen 1310 of a display 1301 when the speed of a scroll input 1330 entered through a scroll bar 1315 displayed on the screen 1310 is less than a preset value, and FIG. 13(*b*) illustrates a screen 1310 of a display 1301 when the speed of a scroll input 1330 entered through the scroll bar 1315 displayed on the screen 1310 is a preset value or more, which is referred to as 'fast scroll.'

Referring to FIG. 13(*a*), when the speed of the scroll input 1330 is less than the preset value, all of at least one object(s) corresponding to the size of the screen 1310 of the display 1301 among the plurality of objects included in the scroll page 1320 while the scroll input 1330 is entered are displayed on the screen 1310. In particular, objects News1 through News10 are displayed on the screen at a given point in time in FIG. 13(*a*) when the scroll speed input is slow.

Referring to FIG. 13(*b*), when the speed of the scroll input 1330 is the preset value or more, i.e., fast scroll, a second object 1300*a* (e.g., Text 1 or Text 2) generated based on at least one first object (e.g., News 8 or News 12) selected from among the plurality of objects (e.g., list items) included in the scroll page 1320 while the scroll input 1330 is entered may be displayed on the screen 1310. The at least one selected first object (e.g., News 8 and/or News 12) may split the scroll page 1320 including the plurality of objects into a plurality of blocks (e.g., Blocks 1 to 4) based on the representative object selection reference. The plurality of blocks Blocks 1 to 4 split may have the same or different sizes according to the block split reference. Referring to FIG. 13(*b*), the second object 1300*a* (e.g., Text 1 or Text 2) generated based on the at least one selected object (e.g., News 8 or News 12, respectively) may be displayed on the center of the screen 1310.

Thus, upon rapid scrolling, the second object(s) 1300*a* (e.g., Text 1 and/or Text 2) generated based on the at least one selected first object (e.g., News 8 and/or News 12) may be displayed without loading all of the original objects shown in FIG. 13(*a*) corresponding to the screen 1310 of the display 1301. Thus, the speed of the scroll input 1330 may remain in the rapid scrolling state while allowing the user to recognize the position of scroll and the first object (e.g., News 8 or News 12) through the second object 1300*a* (e.g., Text 1 or Text 2) generated based on the at least one selected first object (e.g., News 8 or News 12) corresponding to the scroll input 1330. Thus, a sort of indexing function may be implemented.

Although examples have been described in connection with FIGS. 7*a* to 13 in which the scroll input 730, 830, 930, 1030, 1130, 1230, or 1330 is entered through the touchscreen (e.g., the TSP 425) of the display, embodiments of the present disclosure are not limited thereto. For example, the scroll input may also be entered through an input device (e.g., the input device 430), such as a mouse, stylus, touchpad, or the like, of the electronic device 701, 801, 901, 1001, 1101, 1201, or 1301.

According to an example embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an example embodiment of the present disclosure, there is provided a storage medium storing commands configured to be executed by at least one processor to enable the at least one processor to perform at least one operation that may comprise displaying at least a portion of a scroll page including a plurality of objects on a screen of a display of the electronic device and when a speed of a scroll input is a preset value or more while the scroll input is entered to the screen, displaying, on the display, at least one second object corresponding to at least one first object selected from among the plurality of objects.

As is apparent from the foregoing description, according to example embodiments of the present disclosure, upon entry of a fast scroll to the display screen of an electronic device displaying at least a portion of a scroll page including a plurality of objects, some representative objects selected from among the plurality of objects included in the at least portion of the scroll page (or objects generated based on the selected representative objects) corresponding to the screen size of the display may be displayed, allowing the user to grasp the position of the scroll or objects corresponding to the position of the scroll.

Upon rapid scrolling, the selected representative objects may be displayed at the intervals adjusted according to the scrolling speed, increasing the scrolling speed. Despite the increase in the scrolling speed, the user may grasp the position of scroll or objects corresponding to the position of scroll since some representative objects selected are displayed at the intervals adjusted as per the scrolling speed.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

What is claimed is:

1. An electronic device, comprising:
   a display;
   a memory; and
   a processor configured to:
   control the display to display a first portion of a scroll page on a screen of the display, the scroll page including a plurality of objects stored in the memory,
   receive a scroll input with respect to the first portion of the scroll page;
   based on a speed of the scroll input being a first speed, generate text and voice data corresponding to at least one first object from among the plurality of objects, control the display to display the text while at least part of the first portion of the scroll page and a second portion of the scroll page are displayed based on the scroll input, and output the voice data through a sound output device while the text is displayed on the screen of the display, wherein the at least part of the first portion of the scroll page includes at least part of the at least one first object and the text is displayed in at least one of a position of the at least one first object, a central position of the screen, a position corresponding to a scroll bar as per the scroll input, or a combination thereof, wherein the voice data is voice data corresponding to tag information of the at least one first object, and wherein the text is displayed overlapping the plurality of objects; and based on the speed of the scroll input being a second speed different from the first speed, control the display to display, on the display, the at least part of the first portion of the scroll page and at least part of the second portion of the scroll page while refraining from displaying the text.

2. The electronic device of claim 1, wherein a number of the at least one first object is smaller than the number of the plurality of objects.

3. The electronic device of claim 1, wherein the processor is configured to:

based on the speed of the scroll input being the first speed, control the display to display, on the screen of the display, at least one preset replacement image smaller in volume than the plurality of objects on an other area of the scroll page other than the text.

4. The electronic device of claim 1, wherein the plurality of objects include at least one of an image, multimedia data, voice data, text, a list item, or a combination thereof.

5. The electronic device of claim 1, wherein the processor is configured to:

detect a direction and speed of the scroll input entered to the screen, determine whether the detected speed of the scroll input is the first speed, in response to the detected speed of the scroll input being the first speed, split the scroll page into a plurality of blocks based at least on a screen size of the display and/or the detected direction of the scroll input, select, as a representative object, at least one first object among at least one object included in each of the blocks based on a representative object selection reference, generate the text obtained based on the at least one selected first object based at least on information related to the at least one selected first object, and control to the display to display the generated text on the display.

6. The electronic device of claim 5, wherein the processor is configured to determine a size for the plurality of blocks based at least on the detected speed of the scroll input.

7. The electronic device of claim 6, wherein the processor is configured to increase the size for the plurality of blocks as the detected speed of the scroll input increases.

8. The electronic device of claim 5, wherein the representative object selection reference includes at least one of a sorting turn of a corresponding object in each block, an access count, whether corrected or not, whether shared with another application, whether designated by a user, or a combination thereof.

9. The electronic device of claim 1, wherein the processor is configured to adjust at least one of a size and transparency of the at least one first object, or a combination thereof, to generate the text.

10. The electronic device of claim 1, wherein the display includes a touch screen panel for receiving the scroll input.

11. The electronic device of claim 1, wherein the processor is configured to: based on the speed of the scroll input being the first speed, adjust a size and transparency of the plurality of objects in the first portion of the scroll page and the second portion of the scroll page, wherein the text is generated based on metadata associated with the at least one first object corresponding to the text.

12. A method for displaying a screen by an electronic device, the method comprising:

displaying at least a first portion of a scroll page including a plurality of objects on a screen of a display of the electronic device;

receiving a scroll input with respect to the first portion of the scroll page;

based on a speed of the scroll input being a first speed, generating text and voice data corresponding to at least one first object from among the plurality of objects, displaying the text while at least part of the first portion of the scroll page and a second portion of the scroll page are displayed based on the scroll input, and outputting the voice data through a sound output device while the text is displayed on the screen of the display, wherein the at least part of the first portion of the scroll page includes at least part of the at least one first object and the text is displayed in at least one of a position of the at least one first object, a central position of the screen, a position corresponding to a scroll bar as per the scroll input, or a combination thereof, wherein the voice data is voice data corresponding to tag information of the at least one first object, and wherein the text is displayed overlapping the plurality of objects; and based on the speed of the scroll input being a second speed different from the first speed, control the display to display, on the display, the at least part of the first portion of the scroll page and at least part of the second portion of the scroll page while refraining from displaying the text.

13. The method of claim 12, wherein displaying the text on the display includes:

detecting a speed and direction of the scroll input applied to the screen, determining whether the detected speed of the scroll input is a preset value or more, when the detected speed of the scroll input is the preset value or more, splitting the scroll page into a plurality of blocks based at least on a screen size of the display and/or the detected direction of the scroll input, selecting, as a representative object, at least one first object among at least one object included in each of the blocks based on a representative object selection reference, generating the text obtained based on the at least one selected first object based at least on information related to the at least one selected first object, and displaying the at least one generated text on the display.

14. The method of claim 13, wherein splitting the scroll page into the plurality of blocks includes determining a size for the plurality of blocks based at least on the detected speed of the scroll input.

15. The method of claim 13, wherein selecting the at least one first object includes selecting, as a representative object, at least one first object among at least one object in each block based on a representative object selection reference.

16. The method of claim 12, wherein displaying the text on the display includes:
    determining that at least one of a position of the at least one first object, a central position of the screen, a position corresponding to a scroll bar as per the scroll input, or a combination thereof is a position of display, and
    displaying the generated text in the determined position.

17. The method of claim 12, further comprising adjusting at least one of a size and transparency of the at least one first object, or a combination thereof, to generate the text.

18. A non-transitory computer readable recording medium recording a program running on a computer, the program including executable commands executed by a processor to enable the processor to:
    display at least a first portion of a scroll page including a plurality of objects on a screen of a display of an electronic device,
    receive a scroll input with respect to the first portion of the scroll page,
    based on a speed of the scroll input being a first speed, generate text and voice data corresponding to at least one first object from among the plurality of objects, display, on the display, the text while at least part of the first portion of the scroll page and a second portion of the scroll page are displayed based on the scroll input, and output the voice data through a sound output device while the text is displayed on the screen of the display, wherein the at least part of the first portion of the scroll page includes at least part of the at least one first object and the text is displayed in at least one of a position of the at least one first object, a central position of the screen, a position corresponding to a scroll bar as per the scroll input, or a combination thereof, wherein the voice data is voice data corresponding to tag information of the at least one first object, and wherein the text is displayed overlapping the plurality of objects, and
    based on the speed of the scroll input being a second speed different from the first speed, control the display to display, on the display, the at least part of the first portion of the scroll page and at least part of the second portion of the scroll page while refraining from displaying the text.

* * * * *